US006861482B2

(12) United States Patent
Brunelle et al.

(10) Patent No.: US 6,861,482 B2
(45) Date of Patent: Mar. 1, 2005

(54) WEATHERABLE, THERMOSTABLE POLYMERS HAVING IMPROVED FLOW COMPOSITION

(75) Inventors: Daniel Joseph Brunelle, Burnt Hills, NY (US); Tiberiu Mircea Siclovan, Rexford, NY (US); Paul Dean Sybert, Evansville, IN (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/307,873

(22) Filed: Dec. 2, 2002

(65) Prior Publication Data

US 2003/0207123 A1 Nov. 6, 2003

Related U.S. Application Data

(63) Continuation-in-part of application No. 09/908,396, filed on Jul. 18, 2001, now Pat. No. 6,610,409.
(60) Provisional application No. 60/134,692, filed on May 18, 1999.

(51) Int. Cl.$^7$ .............................. C08F 8/04; C08G 63/00
(52) U.S. Cl. ....................... 525/439; 528/176; 528/190; 528/193; 528/194; 528/196; 525/437; 525/444; 525/446
(58) Field of Search ................................. 528/176, 190, 528/193, 194, 196; 525/437, 439, 444

(56) References Cited

U.S. PATENT DOCUMENTS

| | | |
|---|---|---|
| 3,030,331 A | 4/1962 | Goldberg |
| 3,169,121 A | 2/1965 | Goldberg |
| 3,207,814 A | 9/1965 | Goldberg |
| 3,444,129 A | 5/1969 | Young, Jr. et al. |
| 3,460,961 A | 8/1969 | Young et al. |
| 3,492,261 A | 1/1970 | Young, Jr. et al. |
| 3,503,779 A | 3/1970 | Young, Jr. et al. |
| 3,506,470 A | 4/1970 | Young, Jr. et al. |
| 3,939,117 A | 2/1976 | Ueno |
| 4,127,560 A | 11/1978 | Kramer |
| 4,156,069 A | 5/1979 | Prevorsek et al. |
| 4,194,038 A | 3/1980 | Baker et al. |
| 4,217,438 A | 8/1980 | Brunelle et al. |
| 4,238,596 A | 12/1980 | Quinn |
| 4,238,597 A | 12/1980 | Markezich et al. |
| 4,281,099 A | 7/1981 | Maresca |
| 4,286,083 A | 8/1981 | Kochanowski |
| 4,308,406 A | 12/1981 | Takenaka et al. |
| 4,334,053 A | 6/1982 | Freitag et al. |
| 4,414,230 A | 11/1983 | Hanabata et al. |
| 4,454,275 A | 6/1984 | Rosenquist |
| 4,482,694 A | 11/1984 | Freitag et al. |
| 4,487,896 A | 12/1984 | Mark et al. |
| 4,495,325 A | 1/1985 | DeBergalis et al. |
| 4,503,121 A | 3/1985 | Robeson et al. |
| 4,506,065 A | 3/1985 | Miller et al. |
| 4,576,842 A | 3/1986 | Hartsing et al. |
| 4,617,368 A | 10/1986 | Freitag et al. |
| 4,643,937 A | 2/1987 | Dickinson et al. |
| 4,894,486 A | 1/1990 | Neil, Jr. et al. |
| 4,931,364 A | 6/1990 | Dickinson |
| 4,948,864 A | 8/1990 | Imai et al. |
| 4,973,652 A | 11/1990 | Ebert et al. |
| 4,992,322 A | 2/1991 | Curry et al. |
| 5,030,505 A | 7/1991 | Dickinson |
| 5,036,150 A | 7/1991 | Kawakami et al. |
| 5,064,704 A | 11/1991 | Stewart |
| 5,264,548 A | 11/1993 | Brunelle et al. |
| 5,318,850 A | 6/1994 | Pickett et al. |
| 5,321,114 A | 6/1994 | Fontana et al. |
| 5,414,149 A | 5/1995 | Garrett et al. |
| 5,510,182 A | 4/1996 | Fontana et al. |
| 5,552,463 A | 9/1996 | Akkapeddi et al. |
| 5,714,567 A | 2/1998 | Idage et al. |
| 5,807,965 A | 9/1998 | Davis |
| 5,846,659 A | 12/1998 | Löwer et al. |
| 5,916,997 A | 6/1999 | Webb et al. |
| 6,087,007 A | 7/2000 | Fujii et al. |
| 6,136,441 A | 10/2000 | MacGregor et al. |
| 6,143,839 A | 11/2000 | Webb et al. |
| 6,228,910 B1 | 5/2001 | Shakhnovich |
| 6,265,522 B1 | 7/2001 | Brunelle et al. |

(List continued on next page.)

FOREIGN PATENT DOCUMENTS

| | | |
|---|---|---|
| DE | 1 927 938 | 12/1970 |
| EP | 0 733 470 | 9/1996 |
| JP | 56/133332 | 10/1981 |
| JP | 1/199841 | 8/1989 |
| JP | 1/201326 | 8/1989 |
| JP | 94122756 A | 5/1994 |
| WO | WO 00/26275 | 5/2000 |

OTHER PUBLICATIONS

Cohen et al., *Journal of Polymer Science: Part A–1*, vol. 9, 3263–3299 (1971).
Eareckson, *Journal of Polymer Science*, vol. XL, 399–406 (1959).
Application Serial No. 09/368,705, filed Aug. 5, 1999.
Application Serial No. 09/416,529, filed Oct. 12, 1999.
Application Serial No. 09/908,387, filed Jul. 19, 2001.

*Primary Examiner*—Samuel A. Acquah
(74) *Attorney, Agent, or Firm*—Andrew J. Caruso; Patrick K. Patnode

(57) ABSTRACT

The present invention describes the incorporation of several types of soft-block materials into resorcinol phthalate-co-polycarbonate polymers. In preferred embodiments, the soft-block materials contain aliphatic moieties or silicones as flexibilizing units. Several methods of incorporation into the copolymer structure are described including co-reaction of diols with iso/terephthaloyl chloride, replacement of the normal chainstopper with a p-alkylphenol, replacement of a portion of the bisphenol A with an aliphatic ester-bisphenol, and co-reaction of aliphatic diacid chlorides. The polymers of the present invention have good flow characteristics at temperatures generally used for coating, and have good thermostability and weatherability.

86 Claims, No Drawings

U.S. PATENT DOCUMENTS

| | | |
|---|---|---|
| 6,291,589 B1 | 9/2001 | Brunelle et al. |
| 6,294,647 B1 | 9/2001 | Brunelle et al. |
| 6,306,507 B1 | 10/2001 | Brunelle et al. |
| 6,410,620 B2 | 6/2002 | Shakhnovich |
| 6,414,058 B2 | 7/2002 | Shakhnovich |
| 6,417,253 B1 | 7/2002 | Shakhnovich |
| 6,596,843 B2 | 7/2003 | Brunelle et al. |
| 6,610,409 B2 | 8/2003 | Pickett et al. |

WEATHERABLE, THERMOSTABLE POLYMERS HAVING IMPROVED FLOW COMPOSITION

CROSS REFERENCE TO RELATED APPLICATIONS

This application is a continuation-in-part of copending U.S. Application Ser. No. 09/908,396, filed Jul. 18, 2001, now U.S. Pat. No. 6,610,409, which claims the benefit of U.S. Provisional Application No. 60/134,692, filed May 18, 1999, and U.S. application Ser. No. 09/368,706, now U.S. Patent No. 6,306,507, filed Aug. 5, 1999, and which applications are incorporated herein by reference.

BACKGROUND OF THE INVENTION

The present invention relates to polymers that are thermostable, weatherable and have good flow characteristics. More particularly, the present invention relates to poly(resorcinol phthalate-polycarbonate) copolymers that include soft-block moieties. Such polymers may be advantageously used in multilayer articles as UV-protective coatings.

Various polymeric articles have a problem of long-term color instability. In many cases this instability is seen as yellowing of the polymer or loss of glossiness. Yellowing of polymers is often caused by the action of ultraviolet radiation. Such yellowing is frequently designated "photoyellowing". To reduce photoyellowing, ultraviolet absorbing compounds (UVA's) may be incorporated into the polymer. For the most part, UVA's are low molecular weight compounds, which must be employed at relatively low levels, typically up to 1% by weight, to avoid degradation of the physical properties of the polymer. For example, incorporation of UVAs may lead to loss of impact strength, loss of high temperature properties as reflected in heat distortion temperature, and/or susceptibility to attack by organic liquids.

Polymers comprising polyesters containing resorcinol arylate chain members often provide good resistance to photoyellowing and loss of gloss, and thus are considered to possess good "weatherability." The arylate moieties typically contain isophthalate, terephthalate, and mixtures of isophthalate and terephthalate. Polyesters of resorcinol arylates may provide good protection against photoyellowing when coated over a resinous substrate.

The good weatherability properties of polyesters containing resorcinol arylate units is believed to arise in large part from the screening effect these polymers may provide against ultraviolet (UV) light. On exposure to UV light, polymers comprising resorcinol arylate chain members can undergo a photochemically-induced Fries rearrangement that converts at least a portion of the polymer from polyester chain members to o-hydroxybenzophenone-type chain members. The o-hydroxybenzophenone-type chain members act to screen against further UV exposure and protect UV-sensitive components underlying a resorcinol arylate-containing composition.

Polyesters containing resorcinol arylate chain members may be made using melt polymerization or interfacial methods. Polyesters containing resorcinol arylate chain members may be prepared by melt methods as disclosed in U.S. Pat. No. 4,127,560 and in Japanese Kokai 1/201,326. The methods, however, do not allow the incorporation of greater than 30 mole percent terephthalate and were found to result in a polyester having unacceptable levels of color. Polyesters containing resorcinol arylate chain members have also been prepared by an interfacial method (see e.g., U.S. Pat. No. 3,460,961; and Eareckson, Journal of Polymer Science, vol. XL, pp. 399–406 (1959)).

One common problem in the preparation of resorcinol arylate-containing polyesters is the presence of destabilizing anhydride bonds, which are believed to be easily broken under thermal conditions typical of polycarbonate processing to produce shorter chains terminated by acid end groups. These acid end-groups may in turn, accelerate the hydrolysis of the arylate moiety, generating additional carboxyl and hydroxyl end-groups, and further contributing to molecular weight degradation and loss of other desirable properties. Methods for preparing thermostable resorcinol arylate-containing polyesters substantially free of anhydride bonds are described in commonly owned U.S. Pat. Nos. 6,265,522, 6,291,589, 6,294,647, and 6,306,507.

The good weatherability properties of polymers comprising resorcinol arylate chain members make them especially useful in blends and in multilayer articles in which the polymers act as a protecting layer for more sensitive substrate components. Multilayer articles containing layers made from resorcinol arylate-containing polyester have been described by Cohen et al., Journal of Polymer Science: Part A-1, vol. 9, 3263–3299 (1971) and in U.S. Pat. No. 3,460,961. However, the coatings developed using this method were thermally unstable and had to be applied by solution coating followed by evaporation of the solvent. Also, Japanese Kokai 1/199,841 discloses a method for coating bottles using a polyester of resorcinol and isophthalic acid. The method was limited, however, in only describing coating of poly(ethylene terephthalate) substrates.

Thus, polymers comprising resorcinol arylate have proven to be very useful materials for weatherable applications, and methods are available for making polymers comprising resorcinol arylate that are both weatherable and, due to the almost complete elimination of anhydride linkages, thermostable. Additionally, this family of polymers also has good solvent resistance, good scratch resistance, and excellent ductility. One limitation of this family, however, is the fact that the melt viscosity is higher than polycarbonates with comparable molecular weights. This limitation can potentially preclude some applications, such as use of the polymer for coating UV-sensitive articles. Also, for injection molding of blends with other polymers or the manufacture of multilayer films made by co-extrusion, a match of melt viscosity is preferred. In addition, manufacture of large or thin-walled parts requires low melt viscosity.

What is needed then, is a way to produce thermostable, weatherable polymers comprising resorcinol arylate with good flow characteristics at the temperatures used for coating. To be cost effective, the method should employ components that are easily obtained and that can be incorporated into existing polymerization protocols.

BRIEF SUMMARY OF THE INVENTION

The present invention relates to polymers that are thermostable, weatherable and have good flow characteristics. More particularly, the present invention relates to poly(resorcinol phthalate-co-polycarbonate) copolymers that include soft-block moieties. Thus, in one aspect, the present invention comprises a thermostable, weatherable, resorcinol ester polycarbonate polymer having good flow characteristics wherein said polymer comprises: (a) a resorcinol arylate polyester chain; (b) at least one organic carbonate group; and (c) at least one soft-block chemical moiety.

In another aspect, the present invention describes a method of making a resorcinol ester polycarbonate polymer having good flow characteristics comprising: (a) generating a resorcinol arylate polyester chain; (b) conducting an interfacial polymerization in the presence of at least one divalent organic radical to generate a poly(resorcinol arylate-co-polycarbonate) comprising an organic carbonate; and (c) incorporating at least one soft-block chemical moiety into the polymer during step (a) or step (b) or both.

DETAILED DESCRIPTION

The present invention may be understood more readily by reference to the following detailed description of preferred embodiments of the invention and the examples included herein. In the specification and the claims which follow, reference will be made to a number of terms which shall be defined to have the following meanings:

The singular forms "a", "an" and "the" include plural references unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyestercarbonates.

"BPA" is herein defined as bisphenol A or 2,2-bis(4-hydroxyphenyl)propane.

"Catalytically effective amount" refers to the amount of the catalyst at which catalytic performance is exhibited.

As used herein the term "monofunctional phenol" means a phenol comprising a single reactive hydroxy group.

As used herein the term "aliphatic radical" refers to a radical having a valence of at least one comprising a linear or branched array of atoms which is not cyclic, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Thus, the array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "aromatic radical" refers to a radical having a valence of at least one comprising at least one aromatic group optionally substituted with substituents selected from the group consisting of lower alkyl, lower alkoxy, lower alkylsulfanyl, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "cycloaliphatic radical" refers to a radical having a valence of at least one comprising an array of atoms which is cyclic but which is not aromatic optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

As used herein, the term "alkyl" refers to a straight or branched chain hydrocarbon having from one to ten carbon atoms, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of "alkyl" as used herein include, but are not limited to, methyl, n-butyl, n-pentyl, isobutyl, and isopropyl, and the like. As used herein, the term "lower" refers to a group having between one and six carbons.

As used herein, the term "alkylene" refers to a straight or branched chain divalent hydrocarbon radical having from one to ten carbon atoms, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of "alkylene" as used herein include, but are not limited to, methylene, ethylene, and the like.

As used herein, the term "alkenyl" refers to a hydrocarbon radical having from two to ten carbons and at least one carbon—carbon double bond, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed.

As used herein, the term "alkenylene" refers to a straight or branched chain divalent hydrocarbon radical having from two to ten carbon atoms and one or more carbon—carbon double bonds, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of "alkenylene" as used herein include, but are not limited to, ethene-1,2-diyl, propene-1,3-diyl, methylene-1,1-diyl, and the like.

As used herein, "cycloalkyl" refers to an alicyclic hydrocarbon group with one or more degrees of unsaturation, having from three to twelve carton atoms, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, nitro, cyano, halogen, or lower perfluoroalkyl, multiple degrees of substitution being allowed. "Cycloalkyl" includes by way of example cyclopropyl, cyclobutyl, cyclopentyl, cyclohexyl, cycloheptyl, or cyclooctyl, and the like.

As used herein, the term "cycloalkylene" refers to a non-aromatic alicyclic divalent hydrocarbon radical having from three to twelve carbon atoms and optionally possessing one or more degrees of unsaturation, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, nitro, cyano, halogen, or lower perfluoroalkyl, multiple degrees of substitution being allowed. Examples of "cycloalkylene" as used herein include, but are not limited to, cyclopropyl-1,1-diyl, cyclopropyl-1,2-diyl, cyclobutyl-1, 2-diyl, cyclopentyl-1,3-diyl, cyclohexyl-1,4-diyl, cycloheptyl-1,4-diyl, or cyclooctyl-1,5-diyl, and the like.

As used herein, the term "aryl" refers to a benzene ring or to an optionally substituted benzene ring system fused to one or more optionally substituted benzene rings, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, tetrazolyl, carbamoyl optionally substituted by alkyl, aminosulfonyl optionally substituted by alkyl, acyl, aroyl, heteroaroyl, acyloxy, aroyloxy, heteroaroyloxy, alkoxycarbonyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of aryl include, but are not limited to, phenyl, 2-naphthyl, 1-naphthyl, 1-anthracenyl, and the like.

As used herein, the term "arylene" refers to a benzene ring diradical or to a benzene ring system diradical fused to one or more optionally substituted benzene rings, optionally substituted with substituents selected from the group consisting of lower alkyl, lower alkoxy, lower alkylsulfanyl, lower alkylsulfenyl, lower alkylsulfonyl, oxo, hydroxy, mercapto, amino optionally substituted by alkyl, carboxy, tetrazolyl, carbamoyl optionally substituted by alkyl, aminosulfonyl optionally substituted by alkyl, acyl, aroyl, heteroaroyl, acyloxy, aroyloxy, heteroaroyloxy, alkoxycarbonyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of "arylene" include, but are not limited to, benzene-1,4-diyl, naphthalene-1,8-diyl, and the like.

As used herein, the term "direct bond", where part of a structural variable specification, refers to the direct joining of the substituents flanking (preceding and succeeding) the variable taken as a "direct bond".

The present invention describes polymers that are thermostable, weatherable and have good flow characteristics. The present invention provides various methods to produce resorcinol arylate polycarbonate copolymers that include soft-block moieties. In addition to being thermostable to conditions typically required for polymer processing and providing good protection against UV degradation, such polymers have good scratch resistance, good solvent resistance, and excellent ductility. Such polymers may be used in multilayer articles as UV-protective coatings or for flow injection applications.

Thus, in one aspect, the present invention describes a resorcinol ester polycarbonate polymer having good flow characteristics comprising: (a) a resorcinol arylate polyester chain; (b) at least one organic carbonate group; and (c) at least one soft-block chemical moiety.

In an embodiment, the polymer is made using an interfacial method. In an embodiment, the resorcinol arylate polyester chain comprises the condensation of at least one resorcinol moiety with at least one dicarboxylic acid dichloride, wherein the dicarboxylic acid residues comprise a monocyclic aromatic moiety or a polycyclic aromatic moiety.

Preferably, the resorcinol arylate polyester chain is substantially free of anhydride linkages. More preferably, and to generate a chain substantially free of anhydride linkages, the resorcinol arylate polyester chain comprises the condensation of at least one resorcinol moiety with at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups on the resorcinol moiety.

In an embodiment, the resorcinol moiety used to generate the resorcinol arylate polyester chain comprises compounds of Formula I

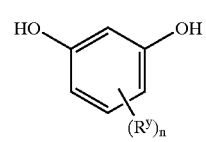

Formula I wherein $R^y$ is at least one of $C_{1-12}$ alkyl or halogen, and n is 0–3.

Preferably, the resorcinol moiety used to generate the resorcinol arylate polyester chain comprises unsubstituted resorcinol, 2-methyl resorcinol, and mixtures thereof.

In an embodiment, the dicarboxylic acid residues comprise a monocyclic aromatic moiety or a polycyclic aromatic moiety. Preferably, the at least one dicarboxylic acid dichloride comprises isophthaloyl dichloride, terephthaloyl dichloride, naphthalene-2,6-dicarboxylic acid dichloride and mixtures thereof.

In an embodiment, the resorcinol ester polycarbonate polymer comprises a backbone structure as illustrated in formula IV:

Formula IV

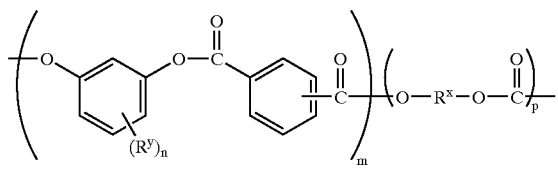

where $R^y$ is at least one of $C_{1-12}$ alkyl or halogen, n is 0–3, m is at least about 8, p is at least about 10, and $R^x$ is at least one divalent organic radical, where for the purposes of Formula IV, the organic radical comprises an aromatic, aliphatic, or cycloaliphatic radical. Preferably, $R^x$ comprises a divalent organic radical derived from a bisphenol of Formula VIII Formula VIII

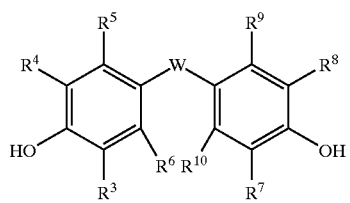

wherein $R^3$–$R^{10}$ are independently a hydrogen atom, halogen atom, nitro group, cyano group, $C_1$–$C_{30}$ alkyl group, $C_4$–$C_{30}$ cycloalkyl group, or $C_6$–$C_{30}$ aryl group, a $C_1$–$C_{30}$ alkoxy, $C_4$–$C_{30}$ cycloalkoxy or $C_6$–$C_{30}$ aryloxy; W is a direct bond, or an oxygen atom, sulfur atom, a C=O group, a $SO_2$ group, $C_1$–$C_{20}$ aliphatic radical, $C_6$–$C_{20}$ aromatic radical, $C_6$–$C_{20}$ cycloaliphatic radical or the group,

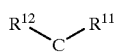

wherein $R^{11}$ and $R^{12}$ are independently a hydrogen atom, $C_1$–$C_{20}$ alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ arylalkyl, $C_5$–$C_{20}$ cycloalkyl groups or a combination thereof. In an embodiment, the dihydroxy aromatic compounds comprise alkyl or alkylene esters.

The term soft-block as used herein, indicates that some segments of the polymers are made from non-aromatic monomer units. Such non-aromatic monomer units are generally aliphatic and are known to impart flexibility to the soft-block-containing polymers. The copolymers include those comprising structural units of Formulas IX, X, XI, XII, XIII, XIV and XVI, as described herein.

In an embodiment, the soft-block moiety comprises structural units of Formulas IX, X, or XI:

Formula IX

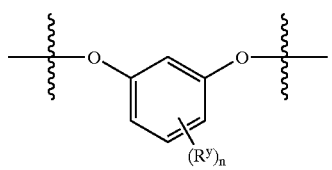

Formula X

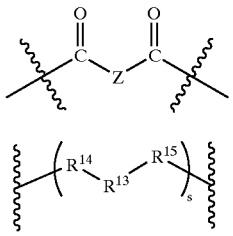

Formula XI

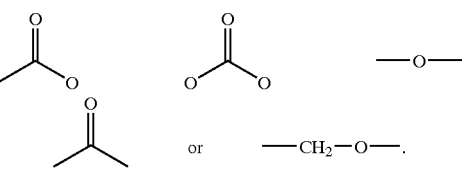

wherein $R^y$ is at least one of $C_{1-2}$ alkyl or halogen, and n is 0–3; Z is a divalent aliphatic radical, or a $C_{3-20}$ straight chain alkylene such as $(CH_2)_{20}$; and s is 0–10, $R^{13}$ is a straight chain alkylene, a $C_{3-10}$ branched alkylene, a $C_{4-10}$ cyclo- or bicycloalkylene group, $CH_2(CH_2OCH_2)_rCH_2$, where r is 1–20, or a polyether comprising the formula $CH_2([CH2]_bO[CH2]_b)_cCH_2$, where b is 1–3 and c is 1–10; and $R^{14}$ and $R^{15}$ each independently represent

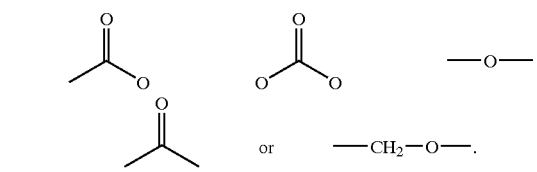

In Formulas IX, X and XI, as elsewhere herein, wavy lines represent polymer chain structure.

In an embodiment, the soft-block moiety comprises an aliphatic ester. In an embodiment, the aliphatic ester comprises at least six carbons. More preferably, the aliphatic ester comprises at least eight carbons, and even more preferably, the aliphatic ester comprises at least ten carbons. Preferably, the aliphatic ester is introduced into the polymer by co-reaction of an aliphatic acid or diacid chloride with an isophthaloyl or terephthaloyl chloride for polymerization with the resorcinol monomer units. More preferably, the soft-block moiety comprises carboxy-terminated polybutadiene, carboxy-terminated butadiene-acrylonitrile copolymer, adipoyl chloride, sebacoyl chloride, or dodecanoyl chloride.

In an embodiment, the soft-block moiety comprises at least one hydroxy end-group. Preferably, the hydroxy terminated soft-block moiety is substituted for a portion of the resorcinol moiety used to produce the resorcinol arylate chain.

In an embodiment, the soft-block moiety comprises oligomers of diethylene glycol, tetraethylene glycol, or low molecular weight polyethylene glycol. Preferably, the molecular weight of the polyethylene glycol is less than 600 Mw.

In another embodiment, the soft-block moiety comprises a hydroxy-terminated aliphatic polyester or polycarbonate oligomer. Preferably, the hydroxy-terminated aliphatic polyester or polycarbonate oligomer is substituted for a portion of the resorcinol to react with the dicarboxylic acid dichloride during synthesis of the polymer.

In yet another embodiment, the soft-block moiety comprises poly(tetrahydrofuran)diol or alternatively, an o,p-mixture of citronellyl citronellate diphenol (CCDP). Preferably, the poly(tetrahydrofuran)diol or CCDP reacts with the dicarboxylic acid dichloride for incorporation into the polymer.

The present invention also provides for heterofunctional soft-block moieties. Thus, in another embodiment, the soft-block moiety comprises a siloxane oligomer as shown in Formula XII,

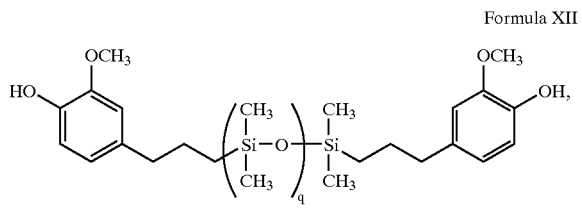

Formula XII where q is in one embodiment 1–99, and in another embodiment 30–70. In one particular embodiment q has a value of 1–20. In another particular embodiment q has a value of 10–20.

In an embodiment, the siloxane oligomer in Formula XII may range from one to at least twenty siloxane units. Thus, the siloxane oligomer may comprise α, ω(3-(4-hydroxy-3-methoxy)-propyl)-deca(dimethylsiloxane) (ED10E), 1,3 (bis-3-(4-hydroxy-3-methoxy)-propyl)-1,1,3,3,-tetramethyl disiloxane (EMME), or oligomers of similar structure.

In another embodiment heterofunctional soft-block moieties may comprise a siloxane oligomer as shown in Formula XVI,

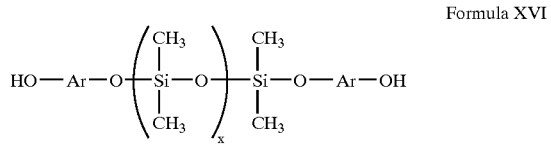

Formula XVI wherein the moiety Ar is derived from a dihydroxy-substituted aromatic hydrocarbon and x has a value of about 10 to about 100.

In some particular embodiments x may have a value in a range of between about 30 and about 100 and in other particular embodiments x may have a value in a range of between about 30 and about 60. In particular embodiments Ar comprises m-phenylene, p-phenylene, 4,4'-biphenylene, 4,4'-bi(3,5-dimethyl)-phenylene, 2,2-bis(4-phenylene) propane, 6,6'-(3,3,3',3'-tetramethyl-1,1'-spirobi[1H-indan]) and similar radicals such as those derived from the dihydroxy-substituted aromatic hydrocarbons disclosed by name or formula (generic or specific) in U.S. Pat. No. 4,217,438. In other particular embodiments the dihydroxy-substituted aromatic hydrocarbon from which Ar is derived includes, but is not limited to 4,4'-(3,3,5-trimethylcyclohexylidene)diphenol; 4,4'-bis(3,5-dimethyl) diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl) methane; bis(4-hydroxy-2,6-dimethyl-3-methoxyphenyl) methane; 1,1-bis(4-hydroxyphenyl)ethane; 1,2-bis(4-hydroxyphenyl)ethane; 1,1-bis(4-hydroxy-2-chlorophenyl) ethane; 2,2-bis(4-hydroxyphenyl)propane; 2,2-bis(3-phenyl-4-hydroxyphenyl)propane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene, 2,6-dihydroxy naphthalene; hydroquinone; resorcinol; $C_{1-3}$ alkyl-substituted resorcinols; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); bis-(4-hydroxyphenyl)sulphide; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl) propane; bis-(3,5-dimethylphenyl-4-hydroxyphenyl) methane; 1,1-bis-(3,5-dimethylphenyl-4-hydroxyphenyl) ethane; 2,2-bis-(3,5-dimethylphenyl-4-hydroxyphenyl) propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; bis-(3,5-dimethylphenyl-4-hydroxyphenyl)sulphide, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi[1H-indene]-6,6'-diol, and mixtures thereof. In a particular embodiment the dihydroxy-substituted aromatic hydrocarbon from which Ar is derived is bisphenol A. As the siloxane oligomers shown in Formulas XII and XVI are also hydroxy terminated, they may also be substituted for a portion of the resorcinol to be introduced into the chain by reaction with the dicarboxylic acid dichloride.

In an embodiment, the soft block moiety is introduced into the polymer during synthesis of the organic carbonate group. Preferably, the soft-block moiety comprises a bisphenol functionalized with an aliphatic ester. More preferably, the bisphenol functionalized with an aliphatic ester has the structure as shown in Formula XIII,

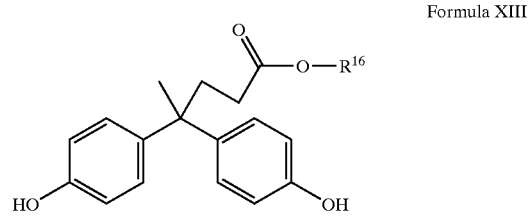

Formula XIII where $R^{16}$ comprises a $C_{4-20}$ aliphatic radical. In an embodiment, the aliphatic ester comprises at least eight carbons. Preferably, the soft-block moiety comprises n-octadecyl-4,4-bis(4-hydroxyphenyl)valerate (C18-BPA-PC), 2-ethylhexyl-4,4-bis(4-hydroxyphenyl)valerate, n-hexadecyl-4,4-bis(4-hydroxyphenyl)valerate, dodecyl-4,4,-bis(4-hydroxyphenyl)valerate, and the like.

In yet another embodiment, the soft-block moiety comprises an aliphatic moiety introduced into the polymer using a chainstopper comprising an aliphatic tail as shown in Formula XIV,

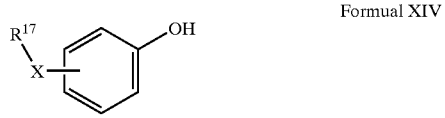

Formual XIV where $R^{17}$ is a $C_6$–$C_2$ alkyl and X is O or $CH_2$, such as p-nonylphenol or p-dodecyiphenol.

In another aspect, the present invention comprises a resorcinol ester polycarbonate polymer comprising at least one soft-block moiety incorporated into a resorcinol phthalate-co-bisphenol A-polycarbonate copolymer substantially free of anhydride linkages, wherein the resorcinol phthalate-co-bisphenol A-polycarbonate copolymer comprises the structural unit of Formula IV, as defined herein, and the soft-block comprises Formula XI, as defined herein. In an embodiment, $R^x$ of Formula IV comprises a divalent organic radical derived from a bisphenol of Formula VIIII as described herein. In one embodiment, the soft-block comprises an aliphatic polyester or a polycarbonate oligomer. In another embodiment, the soft-block comprises a polyethylene oligomer. In yet another embodiment, the soft-block comprises poly(tetrahydrofuran)diol. The soft-block may also comprise an o,p-mixture of citronellyl citronellate diphenol (CCDP).

In another aspect, the present invention comprises a resorcinol ester polycarbonate polymer comprising at least one soft-block moiety incorporated into a resorcinol phthalate-co-bisphenol A-polycarbonate copolymer substantially free of anhydride linkages, wherein the resorcinol phthalate-co-bisphenol A-polycarbonate copolymer comprises the structural unit of Formula IV, as defined herein, and the soft-block comprises Formula X, as defined herein. In an embodiment, $R^x$ of Formula IV comprises a divalent organic radical derived from a bisphenol of Formula VIIII as described herein. In an embodiment, the soft-block comprises an aliphatic ester. Preferably, the ester comprises at least six, and more preferably at least eight, and even more preferably, at least ten carbon atoms.

In another aspect, the present invention comprises a resorcinol ester polycarbonate polymer comprising at least one soft-block moiety incorporated into a resorcinol phthalate-co-bisphenol A-polycarbonate copolymer substantially free of anhydride linkages, wherein the resorcinol phthalate-co-bisphenol A-polycarbonate copolymer comprises the structural unit of Formula IV as defined herein, and the soft-block comprises either a siloxane oligomer as shown in Formula XII, where q is in one embodiment 1–99, in another embodiment 30–70, in yet another embodiment, 1–20, and in another particular embodiment, 10–20, Formula XII

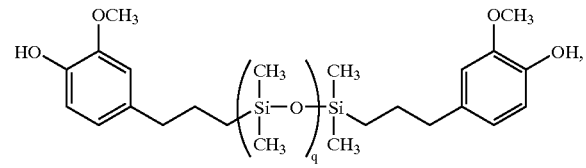

or a siloxane oligomer as shown in Formula XVI, wherein the moiety Ar is derived from a dihydroxy-substituted aromatic hydrocarbon and x has a value of about 10 to about 100:

Formula XVI

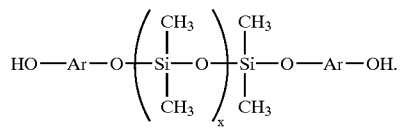

In another aspect, the present invention comprises a resorcinol ester polycarbonate polymer comprising at least one soft-block moiety incorporated into a resorcinol phthalate-co-bisphenol A-polycarbonate copolymer substantially free of anhydride linkages, wherein the resorcinol phthalate-co-bisphenol A-polycarbonate copolymer comprises the structural unit of Formula IV, as defined herein, and the soft-block comprises a bisphenol functionalized with an aliphatic ester as shown in Formula XIII, Formula XIII

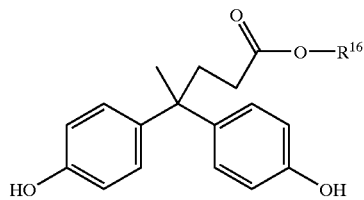

where $R^{16}$ comprises a $C_{4-20}$ aliphatic radical. In an embodiment, $R^x$ of Formula IV comprises a divalent organic radical derived from a bisphenol of Formula VIIII as described herein.

In another aspect, the present invention comprises a resorcinol ester polycarbonate polymer comprising at least one soft-block moiety incorporated into a resorcinol phthalate-co-bisphenol A-polycarbonate copolymer substantially free of anhydride linkages, wherein the resorcinol phthalate-co-bisphenol A-polycarbonate copolymer comprises the structural unit of Formula IV, and the soft-block comprises an aliphatic moiety introduced into the polymer using a chainstopper comprising an aliphatic tail as shown in Formula XIV, Formula XIV

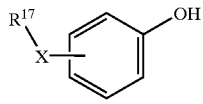

wherein $R^{17}$ comprises a $C_6$–$C_{20}$ alkyl and X is —O— or —CH$_2$—. For example, in an embodiment, the soft-block moiety comprises p-nonylphenol or p-dodecylphenol. In an embodiment, $R^x$ of Formula IV comprises a divalent organic radical derived from a bisphenol of Formula VIIII as described herein.

The polymer may comprise varying levels of the soft-block moiety depending upon the characteristics that are required. Preferably, the soft-block moiety comprises 0.1–25% by weight of the polymer. More preferably, the soft-block moiety comprises 1–20% by weight of the polymer. Even more preferably, the soft-block moiety comprises 2–10% by weight of the polymer.

One of the advantages of incorporating soft-block moieties is the resultant decrease in melt viscosity that occurs upon incorporation of the soft-block. In an embodiment, the reduction in melt viscosity upon addition of the soft-block moiety comprises greater than 5% at 250° C., more preferably, greater that 10% at 250° C., and more preferably, greater than 20% at 250° C.

Preferably, the reduction in melt viscosity is associated with minimal reduction in glass transition temperature. Thus, the polymers of the present invention preferably comprise a glass transition temperature (Tg) greater than about 120° C., and more preferably, greater than 125° C., and even more preferably, greater than 130° C.

Thus, in one embodiment, the present invention comprises a thermostable, weatherable, resorcinol ester polycarbonate polymer having good flow characteristics wherein said polymer comprises: (a) a resorcinol arylate polyester chain substantially free of anhydride linkages; (b) at least one organic carbonate group; and (c) at least one soft-block chemical moiety. For example, copolyesters comprising resorcinol iso- and terephthalate polyester chain members in combination with diacid or diol alkylene chain members (so-called "soft-block" chain members) are disclosed in commonly owned U.S. Pat. No. 5,916,997. These copolymers have excellent weatherability and flexibility. Copolyestercarbonates comprising resorcinol iso- and terephthalate polyester chain members in combination with carbonate chain members are disclosed in commonly owned, co-pending application Ser. No. 09/416,529, filed Oct. 12, 1999. These copolymers also have excellent weatherability and are compatible with polycarbonates in blends. Poly (resorcinol isophthalate) containing a soft-block comprised of sebacic acid functionalities have also been disclosed in U.S. Pat. No. 6,143,839. Still, there has not been a previous description of poly(resorcinol phthalate-co-polycarbonate) poly(RP-co-PC) materials containing soft-block moieties.

In an embodiment, the polymers of the invention have good thermal stability. Thermal stability within the context of the present invention refers to resistance of a polymer to molecular weight degradation under thermal conditions. Thus, a polymer with poor thermal stability shows significant molecular weight degradation under thermal conditions, such as during extrusion, molding, thermoforming, hot-pressing, and like conditions. Molecular weight degradation may also be manifest through color formation and/or in the degradation of other properties such as weatherability, gloss, mechanical properties, and/or thermal properties. Molecular weight degradation can also cause significant variation in processing conditions as the melt viscosity changes.

In one of its aspects, the method of the present invention provides thermally stable polymers comprising arylate polyester chain members. These chain members comprise at least one diphenol residue in combination with at least one aromatic dicarboxylic acid residue. In one embodiment, the diphenol residue of the arylate polyester chain member is derived from a 1,3-dihydroxybenzene moiety, as illustrated in Formula I, Formula I

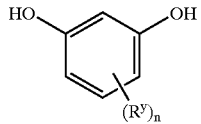

commonly referred to throughout this specification as resorcinol or resorcinol moiety. Resorcinol or resorcinol moiety as used within the context of the present invention should be understood to include both unsubstituted 1,3-dihydroxybenzene and substituted 1,3-dihydroxybenzenes unless explicitly stated otherwise.

In Formula I, $R^y$ is at least one of $C_{1-12}$ alkyl or halogen, and n is 0–3. Alkyl groups, if present, are typically straight-chain, branched, or cyclic alkyl groups, and are most often located in the ortho position to both oxygen atoms although other ring locations are contemplated. Suitable $C_{1-12}$ alkyl groups include, but are not limited to, methyl, ethyl, n-propyl, isopropyl, butyl, iso-butyl, t-butyl, hexyl, cyclohexyl, nonyl, decyl, and aryl-substituted alkyl, including benzyl. In a particular embodiment, an alkyl group is methyl. Suitable halogen groups are bromo, chloro, and fluoro. The value for n in various embodiments may be 0–3, in some embodiments 0–2, and in still other embodiments 0–1. In one embodiment, a resorcinol moiety is 2-methylresorcinol. In another embodiment the resorcinol moiety is an unsubstituted resorcinol moiety in which n is zero.

Suitable dicarboxylic acid residues include aromatic dicarboxylic acid residues derived from monocyclic moieties. In various embodiments suitable dicarboxylic acid residues include those derived from isophthalic acid, terephthalic acid, or mixtures of isophthalic and terephthalic acids. Suitable dicarboxylic acid residues also include those derived from polycyclic moieties, illustrative examples of which include diphenyl dicarboxylic acid, diphenylether dicarboxylic acid, and naphthalenedicarboxylic acid, especially naphthalene-2,6-dicarboxylic acid. In some embodiments, the aromatic dicarboxylic acid residues are derived from mixtures of isophthalic and/or terephthalic acids as typically illustrated in Formula II, Formula II

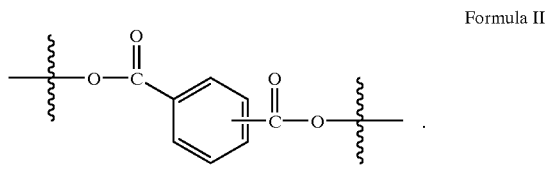

Therefore, in one embodiment, the present invention provides thermally stable polymers comprising resorcinol arylate polyester chain members as typically illustrated in Formula III, Formula III

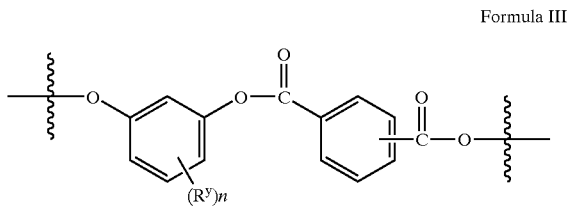

wherein $R^y$ and n are as previously defined.

The copolyester polycarbonates of the present invention include those comprising arylate and organic carbonate blocks as illustrated in Formula IV, Formula IV

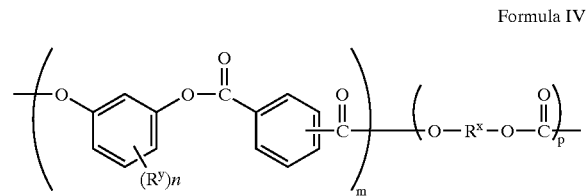

where as above, $R^y$ is at least one of $C_{1-12}$ alkyl or halogen, n is 0–3, m is at least about 8, p is at least about 10, and $R^x$ is at least one divalent organic radical, wherein the organic radical comprises an aromatic, aliphatic or a cycloaliphatic radical.

The arylate blocks have a degree of polymerization (DP), represented by m, in one embodiment of at least about 4, in another embodiment of at least about 10, in another embodiment of at least about 20 and in still another embodiment of about 30–150. The DP of the organic carbonate blocks, represented by p, is in one embodiment generally at least about 10, in another embodiment at least about 20 and in still another embodiment about 50–200. The distribution of the blocks may be such as to provide a copolymer having any desired weight proportion of arylate blocks in relation to carbonate blocks. In general, the content of arylate blocks is in one embodiment about 10–95% by weight and in another embodiment about 50–95% by weight.

In the organic carbonate blocks, each $R^x$ is independently a divalent organic radical. In various embodiments said radical comprises at least one dihydroxy-substituted aromatic hydrocarbon, and at least about 60 percent of the total number of $R^x$ groups in the polymer are aromatic organic radicals and the balance thereof are aliphatic, alicyclic, or aromatic radicals. In some embodiments suitable $R^x$ radicals comprise those described hereinabove for Ar groups of Formula XVI and include, but are not limited to, m-phenylene, p-phenylene, 4,4'-biphenylene, 4,4'-bi(3,5-dimethyl)-phenylene, 2,2-bis(4-phenylene)propane, 6,6'-(3,3,3',3'-tetramethyl-1,1'-spirobi[1H-indan]) and similar radicals such as those which correspond to the dihydroxy-substituted aromatic hydrocarbons disclosed by name or formula (generic or specific) in U.S. Pat. No. 4,217,438.

In some embodiments each $R^x$ is an aromatic organic radical and in other embodiments a radical of Formula V:

Formula V wherein each $A^1$ and $A^2$ is a monocyclic divalent aryl radical and Y is a bridging radical in which one or two carbon atoms separate $A^1$ and $A^2$. The free valence bonds in Formula V are usually in the meta or para positions of $A^1$ and $A^2$ in relation to Y. Compounds in which $R^x$ has Formula V are bisphenols, and for the sake of brevity the term "bisphenol" is sometimes used herein to designate the dihydroxy-substituted aromatic hydrocarbons. It should be understood, however, that non-bisphenol compounds of this type may also be employed as appropriate.

In Formula V, $A^1$ and $A^2$ typically represent unsubstituted phenylene or substituted derivatives thereof, illustrative substituents (one or more) being alkyl, alkenyl, and halogen (particularly bromine). In one embodiment, unsubstituted phenylene radicals are preferred. Both $A^1$ and $A^2$ are often p-phenylene, although both may be o- or m-phenylene or one o- or m-phenylene and the other p-phenylene.

The bridging radical, Y, is one in which one or two atoms separate $A^1$ from $A^2$. In a particular embodiment, one atom separates $A^1$ from $A^2$. Illustrative radicals of this type are —O—, —S—, —SO— or —SO$_2$—, methylene, cyclohexyl methylene, 2-[2.2.1]-bicycloheptyl methylene, ethylene, isopropylidene, neopentylidene, cyclohexylidene, cyclopentadecylidene, cyclododecylidene, adamantylidene, and like radicals.

In some embodiments, gem-alkylene (commonly known as "alkylidene") radicals are preferred. Also included, however, are unsaturated radicals. In some embodiments, the preferred bisphenol is 2,2-bis(4-hydroxyphenyl)propane (bisphenol-A or BPA), in which Y is isopropylidene and $A^1$ and $A^2$ are each p-phenylene. Depending upon the molar excess of resorcinol moiety present in the reaction mixture, $R^x$ in the carbonate blocks may at least partially comprise resorcinol moiety. In other words, in some embodiments of the invention, carbonate blocks of Formula IV may comprise a resorcinol moiety in combination with at least one other dihydroxy-substituted aromatic hydrocarbon.

Diblock, triblock, and multiblock copolyestercarbonates are encompassed in the present invention. The chemical linkages between blocks comprising resorcinol arylate chain members and blocks comprising organic carbonate chain members may comprise at least one of:

(a) an ester linkage between a suitable dicarboxylic acid residue of an arylate moiety and an —O—$R^x$—O— moiety of an organic carbonate moiety, for example as typically illustrated in Formula VI, wherein $R^x$ is as previously defined:

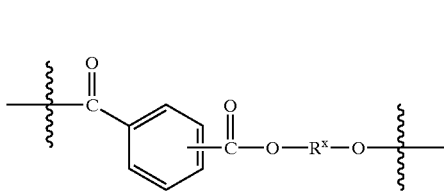

Formula VI and (b) a carbonate linkage between a diphenol residue of a resorcinol arylate moiety and a —(C=O)—O— moiety of an organic carbonate moiety as shown in Formula VII,

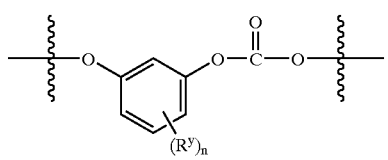

Formula VII wherein $R^y$ and n are as previously defined:

In a preferred embodiment, bisphenol is used to generate the polycarbonate wherein the bisphenol group bisphenols have Formula VIII

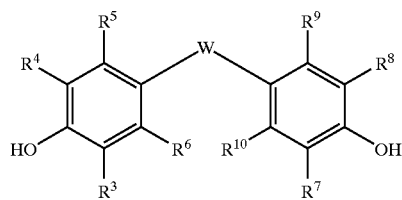

Formula VIII wherein $R^3$–$R^{10}$ are independently a hydrogen atom, halogen atom, nitro group, cyano group, $C_1$–$C_{30}$ alkyl group, $C_4$–$C_{30}$ cycloalkyl group, or $C_6$–$C_{30}$ aryl group, a $C_1$–$C_{30}$ alkoxy, $C_4$–$C_{30}$ cycloalkoxy or $C_6$–$C_{30}$ aryloxy; W is a direct bond, or an oxygen atom, sulfur atom, C=O group, SO$_2$ group, $C_1$–$C_{20}$ aliphatic radical, $C_6$–$C_{20}$ aromatic radical, $C_6$–$C_{20}$ cycloaliphatic radical, or the group,

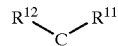

wherein $R^{11}$ and $R^{12}$ are independently a hydrogen atom, $C_1$–$C_{20}$ alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$alkyl, $C_6$–$C_{20}$ aryl, $C_5$–$C_{21}$ arylalkyl, $C_5$–$C_{20}$ cycloalkyl groups or a combination thereof.

As described herein, in a preferred embodiment, the carbonate blocks comprise a bisphenol. Suitable bisphenols VIII are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5- isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-diisopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3 trimethylcyclohexane; 1,1-bis(3-bromo-5-phenyl-4-hydroxyphenyl)-3,3,5-trimethylcyclohexane; 1,1-bis(3,5-diisopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-trimethylcyclohexane; 1,1-bis(3-bromo-5-phenyl-4-hydroxyphenyl)-3,3,5-trimethylcyclohexane; 1,1-bis(3,5-diisopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene and 1,4-bis(2-(4-hydroxy-3-methylphenyl)-2-propyl)benzene. Bisphenol A is preferred.

Poly(resorcinol arylate-polycarbonate) copolymers possess many desirable properties such as, but not limited to, weatherability, flexibility, thermostability, and resistance to physical and chemical degradation. The present invention relies on the use of soft-block functionalities to provide reduced melt viscosity and improved flow characteristics to poly(resorcinol arylate-polycarbonate) polymers. Thus, the present invention teaches the incorporation of melt block functionalities into poly(resorcinol arylate-polycarbonate) polymers.

The term soft-block as used herein, indicates that some segments of the polymers are made from non-aromatic monomer units. Such non-aromatic monomer units are generally aliphatic and are known to impart flexibility to the soft-block-containing polymers. The copolymers include those comprising structural units as described by Formulas IX, X, XI, XII, XIII, XIV, and XVI. It is contemplated, however, that other similar or equivalent structures may be included in the polymer chain to increase the aliphatic nature (and flexibility) of the final product. For example, oligomers comprising functional groups other than oxygen and siloxane may be employed. Also, the present invention contemplates that more that one type of soft-block polymer may be used. For example, it is contemplated that poly(resorcinol arylate-polycarbonate) polymers may be made using at least a portion of the chain stoppers comprising an aliphatic tail along with at least a portion of bisphenol substituted with an aliphatic ester and/or an aliphatic ester substituted for a portion of the dicarboxylic acid dichloride used to produce the chain.

In another aspect, the present invention comprises a method of making a resorcinol ester polycarbonate polymer having good flow characteristics comprising: (a) generating a resorcinol arylate polyester; (b) conducting an interfacial polymerization in the presence of at least one divalent organic radical to generate a poly(resorcinol arylate-co-polycarbonate) comprising an organic carbonate group; and (c) incorporating at least one soft-block chemical moiety into the polymer during step (a) or step (b) or both.

In an embodiment, the resorcinol arylate polyester chain comprises the condensation of at least one resorcinol moiety with at least one dicarboxylic acid dichloride, wherein the dicarboxylic acid residues comprise monocyclic moieties or polycyclic aromatic moieties.

Preferably, the resorcinol arylate polyester chain is substantially free of anhydride linkages. More preferably, and to generate an arylate polyester chain is substantially free of anhydride linkages, the resorcinol arylate polyester chain comprises the interfacial condensation of at least one resorcinol moiety with at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups. Even more preferably, the stoichiometric ratio of total phenolic groups to total acid chloride groups for generation of the resorcinol arylate polyester chain is 1.5–1.01:1.

In an embodiment, the resorcinol moiety used to generate the resorcinol arylate polyester chain comprises compounds of Formula I:

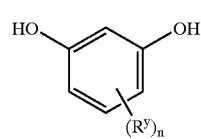

Formula I wherein $R^y$ is at least one of $C_{1-12}$ alkyl or halogen, and n is 0–3. Preferably, the resorcinol moiety used to generate the resorcinol arylate polyester chain comprises unsubstituted resorcinol, 2-methyl resorcinol, and mixtures thereof.

In an embodiment, the dicarboxylic acid residues comprise monocyclic or polycyclic aromatic groups. Preferably, the dicarboxylic acid dichloride comprises isophthaloyl dichloride, terephthaloyl dichloride, naphthalene-2,6-dicarboxylic acid dichloride and mixtures thereof.

In an embodiment, the resorcinol ester polycarbonate polymer comprises structure as illustrated in Formula IV:

Formula IV

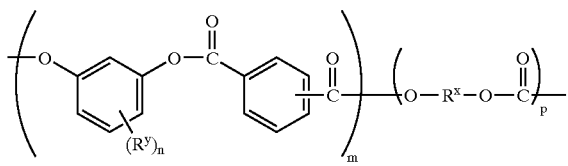

where $R^y$ is at least one of $C_{1-12}$ alkyl or halogen, n is 0–3, m is at least about 8, p is at least about 10, and $R^x$ is at least one divalent organic radical, wherein the organic radical comprises an aromatic, aliphatic or cycloaliphatic radical.

Preferably, $R^x$ comprises a divalent organic radical derived from a bisphenol of Formula VIII:

Formula VIII

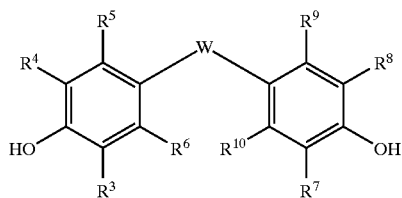

wherein $R^3$–$R^{10}$ are independently a hydrogen atom, halogen atom, nitro group, cyano group, $C_1$–$C_{30}$ alkyl group, $C_4$–$C_{30}$ cycloalkyl group, or $C_6$–$C_{30}$ aryl group, a $C_1$–$C_{30}$ alkoxy, $C_4$–$C_{30}$ cycloalkoxy or $C_6$–$C_{30}$ aryloxy; W is a direct bond, or an oxygen atom, sulfur atom, C=O group, $SO_2$ group, $C_1$–$C_{20}$ aliphatic radical, $C_6$–$C_{20}$ aromatic radical, $C_6$–$C_{20}$ cycloaliphatic radical, or the group,

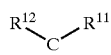

wherein $R^{11}$ and $R^{12}$ are independently a hydrogen atom, $C_1$–$C_{20}$ alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups, or a combination thereof.

In an embodiment, the soft-block moiety comprises structural units of Formulas IX, X or XI:

Formula IX

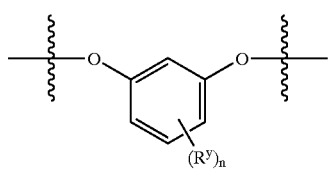

Formula X

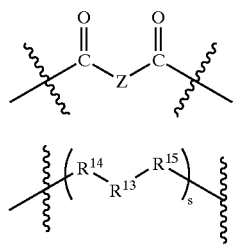

Formual XI

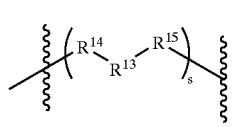

wherein $R^y$ is at least one of $C_{1-12}$, alkyl or halogen, and n is 0–3; Z is a divalent aliphatic radical, or a $C_{3-20}$ straight chain alkylene such as —$(CH_2)_{20}$—; and s is 0–10, $R^{13}$ is a $C_{3-20}$ straight chain alkylene, a $C_{3-10}$ branched alkylene, a $C_{4-10}$ cyclo- or bicycloalkylene group, —$CH_2(CH_2OCH_2)_r$ $CH_2$—, where r is 1–20, or a polyether comprising the formula —$CH_2([CH2]_bO[CH2]_b)_cCH_2$— where b is 1–3 and c is 1–10; and $R^{14}$ and $R^{15}$ each independently represent

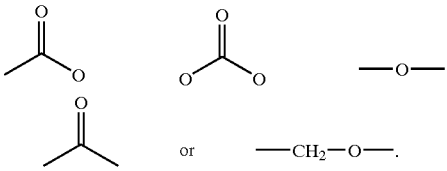

In Formulas IX, X and XI, as elsewhere herein, wavy lines represent polymer chain structure.

In an embodiment, the soft-block moiety comprises an aliphatic ester. In an embodiment, the aliphatic ester comprises at least six carbons. More preferably, the aliphatic ester comprises at least eight carbons, and even more preferably, the aliphatic ester comprises at least ten carbons. Preferably, the aliphatic ester is introduced into the polymer by co-reaction of an aliphatic acid or diacid chloride with an isophthaloyl or terephthaloyl chloride for polymerization with the resorcinol monomer units. More preferably, the soft-block moiety comprises carboxy-terminated polybutadiene, carboxy-terminated butadiene-acrylonitrile copolymer, adipoyl chloride, sebacoyl chloride, or dodecanoyl chloride.

In an embodiment, the soft-block moiety comprises at least one hydroxy end-group. Preferably, the hydroxy terminated soft-block moiety is substituted for a portion of the resorcinol moiety used to produce the resorcinol arylate chain.

In an embodiment, the soft-block moiety comprises oligomers of diethylene glycol, tetraethylene glycol, or low molecular weight polyethylene glycol substituted for a portion of the resorcinol used to generate the chain to react with the dicarboxylic acid dichloride during synthesis of the polymer. Preferably, the molecular weight of the polyethylene glycol is less than 600 Mw.

In another embodiment, the soft-block moiety comprises a hydroxy-terminated aliphatic polyester or polycarbonate oligomer, wherein the hydroxy-terminated aliphatic polyester or polycarbonate oligomer is substituted for a portion of the resorcinol used to generate the chain to react with the dicarboxylic acid dichloride during synthesis of the polymer.

In yet another embodiment, the soft-block moiety comprises poly(tetrahydrofuran)diol or alternatively, an o,p-mixture of citronellyl citronellate diphenol (CCDP). Preferably, the poly(tetrahydrofuran)diol or CCDP also reacts with the dicarboxylic acid dichloride for incorporation into the polymer.

The present invention also provides for various heterofunctional soft-block moieties. Thus, in another embodiment, the soft-block moiety comprises a siloxane oligomer as shown in Formula XII, Formual XII

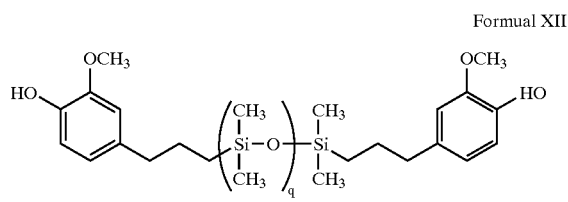

where q is in one embodiment 1–99, and in another embodiment 30–70. In one particular embodiment q has a value of 1–20. In another particular embodiment q has a value of 10–20.

In an embodiment, the siloxane oligomer may range from one to at least twenty siloxane units. Thus, the siloxane oligomer may comprise α, ω(3-(4-hydroxy-3-methoxy)-propyl)-deca(dimethylsiloxane) (ED10E), 1,3(bis-3-(4-hydroxy-3-methoxy)-propyl)-1,1,3,3,-tetramethyl disiloxane (EMME), or oligomers of similar structure.

In still another embodiment the soft-block moiety comprises a siloxane oligomer as shown in Formula XVI, wherein the moiety Ar is derived from a dihydroxy-substituted aromatic hydrocarbon and x has a value of about 10 to about 100:

Formula XVI

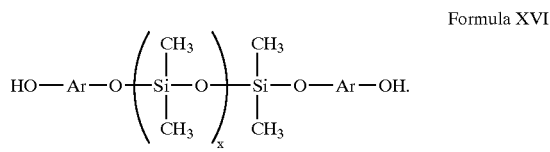

As the siloxane oligomers shown in Formulas XII and XVI are also hydroxy terminated, they may also be substituted for a portion of the resorcinol to be introduced into the chain by reaction with the dicarboxylic acid dichloride.

In an embodiment, the soft block moiety is introduced into the polymer during syntheses of the organic carbonate group. Preferably, the soft-block moiety comprises a bisphenol functionalized with an aliphatic ester. More preferably, the bisphenol functionalized with an aliphatic ester has the structure as shown in Formula XIII, Formula XIII

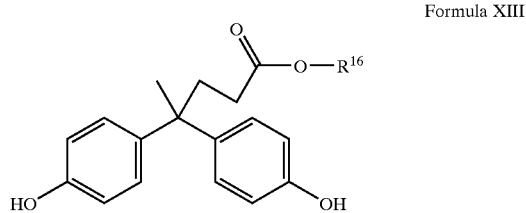

where $R^{16}$ comprises an $C_{4-20}$ aliphatic radical. In an embodiment, the aliphatic ester comprises at least eight carbons. Preferably, the soft-block moiety comprises n-octadecyl-4,4-bis(4-hydroxyphenyl)valerate (C18-BPA-PC), 2-ethylhexyl-4,4-bis(4-hydroxyphenyl)valerate, n-hexadecyl-4,4-bis(4-hydroxyphenyl)valerate, dodecyl-4,4,-bis(4-hydroxyphenyl)valerate, and the like.

In yet another embodiment, the soft-block moiety comprises an aliphatic moiety introduced into the polymer using a chainstopper comprising an aliphatic tail as shown in Formula XIV, Formula XIV

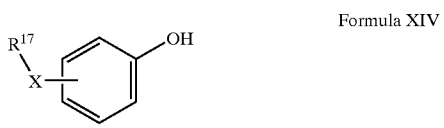

where $R_{17}$ is a $C_6$–$C_{20}$ alkyl and X is —O— or —$CH_2$—, such as p-nonylphenol or p-dodecylphenol.

The polymer may comprise varying levels of the soft-block moiety depending upon the characteristics that are required. Preferably, the soft-block moiety comprises 0.1–25% of the polymer. More preferably, the soft-block moiety comprises 1–20% of the polymer. Even more preferably, the soft-block moiety comprises 2–10% of the polymer.

One of the advantages of incorporating soft-block moieties is the resultant decrease in melt viscosity that occurs upon incorporation of the soft-block. In an embodiment, the reduction in melt viscosity upon addition of the soft-block moiety comprises greater than 5% at 250° C., more preferably, greater that 10% at 250° C., and more preferably, greater than 20% at 250° C.

Preferably, the reduction in melt viscosity is preferably associated with minimal reduction in glass transition temperature. Preferably, the polymers of the present invention comprise a glass transition temperature (Tg) greater than about 120° C., and more preferably, greater than 125° C., and even more preferably, greater than 130° C.

Thus, the present invention provides methods of making a resorcinol ester polycarbonate polymers that incorporate soft-block moieties and thus have good flow characteristics.

For example, in an embodiment, resorcinol phthalate-co-polycarbonate (RP-co-PC) copolymers are made via a two-step, one-pot process (e.g. Equation (1)). In the first step, resorcinol and chainstopper are reacted with a mixture of dicarboxylic dichlorides in $CH_2Cl_2$ using $Et_3N$ as a catalyst with NaOH to control the pH, forming a low-molecular weight resorcinol phthalate polymer to give a compound of Formula III:

Formula III

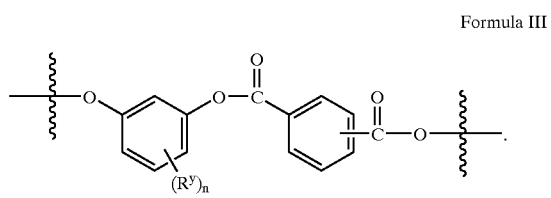

A bisphenol is then added to the resorcinol arylate polyester, and the mixture subjected to phosgenation under typical polycarbonate conditions, to form a RP-co-PC copolymer compound. The soft-block moiety can be included in the polymer (during steps (a) or (b) or both, using various strategies as described herein.

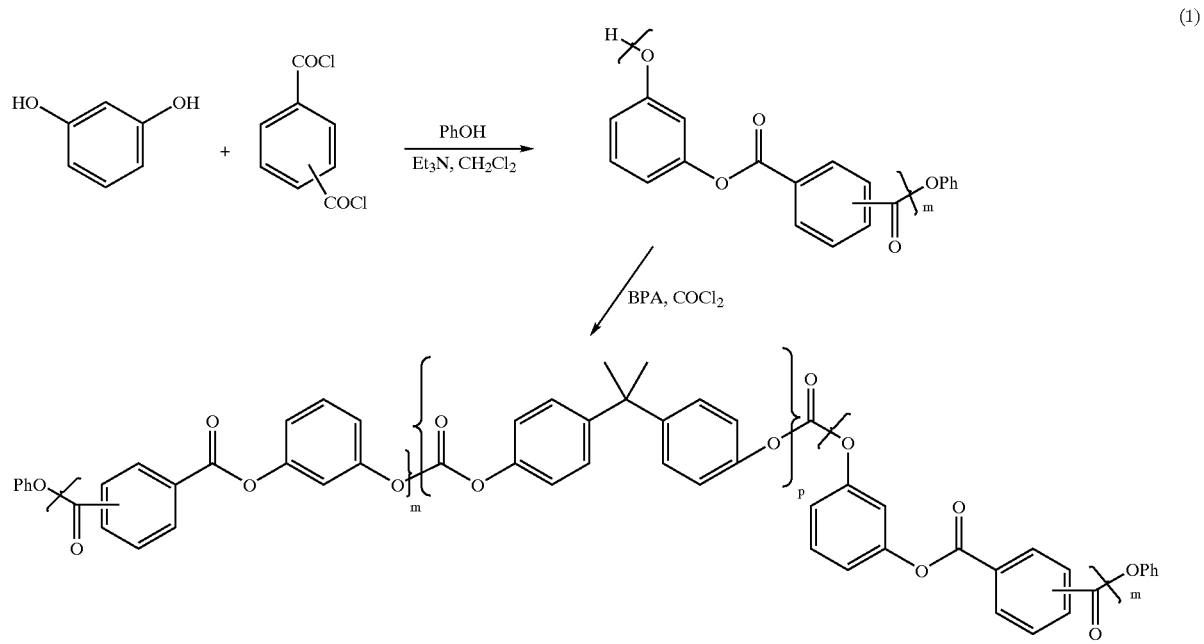

(1)

Thus, in one aspect, the present invention describes a method to make poly(resorcinol arylate polycarbonate) copolymers comprising soft-block moieties. Preferably, the arylate polyester chain polymer members comprise at least one diphenol residue in combination with at least one aromatic dicarboxylic acid residue. The diphenol residue may be derived from a 1,3-dihydroxybenzene moiety, as illustrated in Formula I:

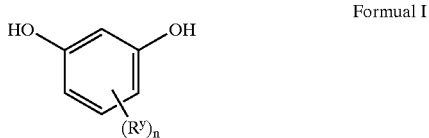

Formual I wherein $R^y$ is at least one of $C_{1-12}$ alkyl or halogen, and n is 0–3. Alkyl groups, if present, are typically straight-chain, branched, or cyclic alkyl groups, and are most often located in the ortho position to both oxygen atoms although other ring locations are contemplated. Suitable $C_{1-12}$ alkyl groups include, but are not limited to, methyl, ethyl, n-propyl, isopropyl, butyl, iso-butyl, t-butyl, hexyl, cyclohexyl, nonyl, decyl, and aryl-substituted alkyl, including benzyl. In a particular embodiment, an alkyl, group is methyl. Suitable halogen groups are bromo, chloro, and fluoro. The value for n in various embodiments may be 0–3, in some embodiments 0–2, and in still other embodiments 0–1. In one embodiment a resorcinol moiety is 2-methylresorcinol. In another embodiment the resorcinol moiety, is an unsubstituted resorcinol moiety in which n is zero.

Suitable dicarboxylic acid dichlorides may comprise aromatic dicarboxylic acid dichlorides derived from monocyclic moieties, illustrative examples of which include isophthaloyl dichloride, terephthaloyl dichloride, or mixtures of isophthaloyl and terephthaloyl dichlorides. Suitable dicarboxylic acid dichlorides may also comprise aromatic dicarboxylic acid dichlorides derived from polycyclic moieties, illustrative examples of which include diphenyl dicarboxylic acid dichloride, diphenylether dicarboxylic acid dichloride, and naphthalenedicarboxylic acid dichloride, especially naphthalene-2,6-dicarboxylic acid dichloride, or from mixtures of monocyclic and polycyclic aromatic dicarboxylic acid dichlorides. In one embodiment the dicarboxylic acid dichloride comprises mixtures of isophthaloyl and/or terephthaloyl dichlorides as typically illustrated in Formula XV:

Formula XV

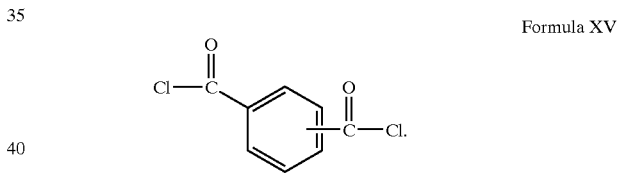

Either or both of isophthaloyl and terephthaloyl dichlorides may be present. In some embodiments the dicarboxylic acid dichlorides comprise mixtures of isophthaloyl and terephthaloyl dichloride in a molar ratio of isophthaloyl to terephthaloyl of about 0.25–4.0:1; in other embodiments the molar ratio is about 0.4–2.5:1; and in still other embodiments the molar ratio is about 0.67–1.5:1.

The resorcinol phthalate-co-polycarbonate copolymers of the present invention are illustrated in Formula IV, Formula IV

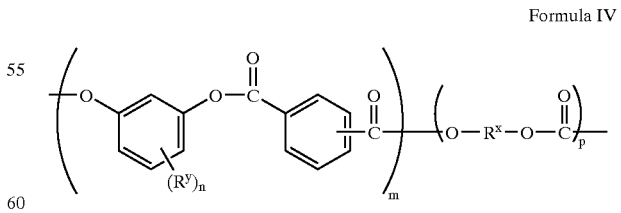

where as above, $R^y$ is at least one of $C_{1-12}$ alkyl or halogen, n is 0–3, m is at least about 8, p is at least 10, and $R^x$ is at least one divalent organic radical as described above.

The present invention relies on the use of soft-block functionalities to provide reduced melt viscosity and improved flow characteristics to RP-co-PC polymers. Thus, the present invention teaches the incorporation of melt block functionalities into RP-co-PC polymers. The melt block functionalities include those comprising structural units as described by Formulas IX, X, XI, XII, XIII, XIV and XVI. However, other similar or equivalent structures may be included in the polymer chain to increase the aliphatic nature (and flexibility) of the final product. For example, oligomers comprising heteroatoms other than oxygen and/or siloxane may be employed. Also, the present invention contemplates that more than one type of soft-block polymer may be used. For example, it is contemplated that polymers may incorporate chain stoppers having an aliphatic tail along with at least a portion of the bisphenol modified with an aliphatic ester group. Alternatively, or additionally, polyethylene glycol may be substituted for a portion of the resorcinol and an aliphatic ester substituted for a portion of the dicarboxylic acid dichloride used for the polymerization using the methods described below.

The present invention comprises various methods by which the soft-block moiety may be incorporated into a resorcinol phthalate-co-polycarbonate (RP-coPC) polymer. In an embodiment, the method uses a chainstopper with an lengthy aliphatic tail. This technique is both simple to implement and effective. For example, p-nonylphenol or p-dodecylphenol may substituted for a normal chainstopper such as phenol in a normal RP-co-PC polymerization reaction (Equation 1). In an embodiment, incorporation of the soft-block moiety results in a large decrease in melt viscosity and flow energy with only a modest reduction in glass transition temperature (Tg) (see e.g., Table 1, samples 15 and 16).

In another embodiment, diols such as polyethylene glycol oligomers may be used as soft-block moieties (see e.g., Table 1, samples 2–7). In an embodiment, a hydroxy-terminated oligomer is pre-reacted with the iso/terephthaloyl chloride in $CH_2Cl_2$ using stoichiometric triethylamine, for Ming a polyethylene glycol oligomer terminated with an iso/terephthaloyl chloride end group as shown in Equation 2, below. In an embodiment, the number of ethylene glycol units (r) ranges from 2–10. Resorcinol is then be added, and the remainder of the RP-co-PC polymerization carried out under usual interfacial polymerization conditions. In an embodiment, the molded polymers are clear and nearly colorless. Lower molecular weight (Mw) oligomers are very effective at reducing melt viscosity, flow energy, and Tg. Lower molecular weight polyethylene glycols such as diethylene glycol (DEG), tetraethylene glycol (TEG), and PEG 300 (see e.g., Table 1, samples 2–4), may be preferable since the higher molecular weight polyethylene glycols can result in the formation of very high molecular weight species.

(2)

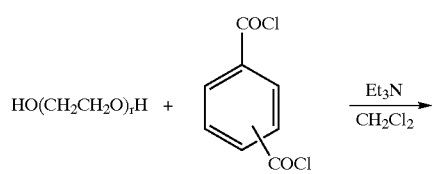

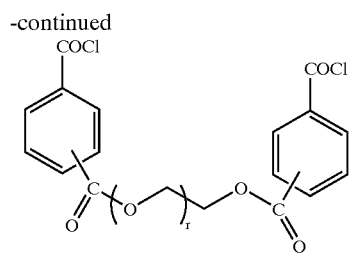

Other diols may be used. In an embodiment, the diol used as a soft-block moiety is an o,p mixture of citronellyl citronellate diphenol (Table 1, sample 20).

In yet another embodiment, poly(tetrahydrofuran)-diol (polyTHF-diol) reduces viscosity as well as Tg, even at a level of only 2% by weight (see e.g., Table 1, sample 17).

The present invention also provides for heterofunctional soft-block moieties. Thus, in another embodiment, the soft-block moiety comprises a siloxane oligomer. The siloxane oligomer may range from one to at least ten siloxane units. Thus, the siloxane oligomer may comprise α, ω(3-(4-hydroxy-3-methoxy)-propyl)-deca(dimethylsiloxane) (ED10E), 1,3 (bis-3-(4-hydroxy-3-methoxy)-propyl)-1,1,3, 3,-tetramethyl disiloxane (EMME), or oligomers of similar structure. As these are also hydroxy terminated, they may also be introduced into the chain by reaction with the dicarboxylic acid dichloride. Examples of siloxane oligomers used in the invention comprise Formula XII, Formula XII

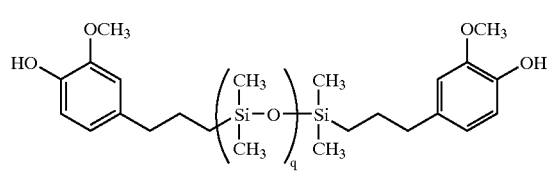

wherein q is in one embodiment 1–99, and in another embodiment 30–70. In one particular embodiment q has a value of 1–20. In another particular embodiment q has a value of 10–20.

Examples of siloxane oligomers used in the invention also comprise Formula XVI, wherein the moiety Ar is derived from a dihydroxy-substituted aromatic hydrocarbon and x has a value of about 10 to about 100:

Formula XVI

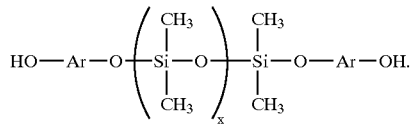

In another embodiment, bisphenol A functionalized with a long chain ester may be incorporated into the RP-co-PC by replacing part of the BPA normally used with ester-bisphenol (see e.g., Table 1, samples 8–10). In an embodiment, the ester bisphenol comprises compounds such as the compounds of Formula XIII, Formula XIII

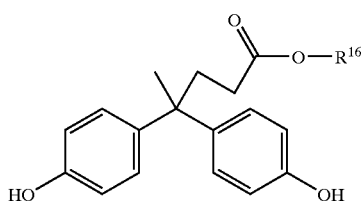

where $R^{16}$ is alkyl chain comprising 4 to at least 20 carbons. In an embodiment, incorporation of ester-bisphenol may reduce Tg, as well as increasing flow and reducing flow energy. In some cases, however, the resultant polymer may be yellow after processing. Purification of the ester diphenol may alleviate the color problem.

In yet another embodiment, soft-block esters are introduced into an RP-co-PC copolymer as esters by co-reaction of aliphatic diacid chlorides along with the iso/terephthaloyl chloride (see e.g., Table I, samples 11–13). In an embodiment, incorporation of these long-chain aliphatic groups results in a dramatic drop in viscosity and Tg.

The method further comprises combining at least one catalyst with the reaction mixture. The catalyst may be present in various embodiments at a total level of 0.1 to 10 mole %, and in some embodiments at a total level of 0.2 to 6 mole % based on total molar amount of acid chloride groups. Suitable catalysts comprise tertiary amines, quaternary ammonium salts, quaternary phosphonium salts, hexaalkylguanidinium salts, and mixtures thereof.

Suitable tertiary amines include triethylamine, dimethylbutylamine, diisopropylethylamine, 2,2,6,6-tetramethylpiperidine, and mixtures thereof. Other contemplated tertiary amines include N—$C_1$–$C_6$-alkyl-pyrrolidines, such as N-ethylpyrrolidine, N—$C_1$–$C_6$-piperidines, such as N-ethylpiperidine, N-methylpiperidine, and N-isopropylpiperidine, N—$C_1$–$C_6$-morpholines, such as N-ethylmorpholine and N-isopropyl-morpholine, N—$C_1$–$C_6$-dihydroindoles, N—$C_1$–$C_6$-dihydroisoindoles, N—$C_1$–$C_6$-tetrahydroquinolines, N—$C_1$–$C_6$-tetrahydroisoquinolines, N—$C_1$–$C_6$-benzo-morpholines, 1-azabicyclo-[3.3.0]-octane, quinuclidine, N—$C_1$–$C_6$-alkyl-2-azabicyclo-[2.2.1]-octanes, N—$C_1$–$C_6$-alkyl-2-azabicyclo-[3.3.1]-nonanes, and N—$C_1$–$C_6$-alkyl-3-azabicyclo-[3.3.1]-nonanes, N,N,N',N'-tetraalkylalkylene-diamines, including N,N,N',N'-tetraethyl-1,6-hexanediamine. In various embodiments tertiary amines are triethylamine and N-ethylpiperidine. Also included are 4-dimethylaminopyridine, 4-pyrrolidino pyridine and other 4-dialkylaminopyridines.

When the catalyst consists of at least one tertiary amine alone, then the catalyst may be present in one embodiment at a total level of 0.1 to 10 mole %, in another embodiment at a total level of 0.2 to 6 mole %, in another embodiment at a total level of 1 to 4 mole %, and in still another embodiment at a total level of 2.5 to 4 mole % based on total molar amount of acid chloride groups. In one embodiment of the invention, all of the tertiary amine is present at the beginning of the reaction before addition of dicarboxylic acid dichloride to resorcinol moiety. In another embodiment a portion of any tertiary amine is present at the beginning of the reaction and a portion is added following or during addition of dicarboxylic acid dichloride to resorcinol moiety. In this latter embodiment the amount of any tertiary amine initially present with resorcinol moiety may range in one embodiment from about 0.005 wt. % to about 10 wt. %, in another embodiment from about 0.01 to about 5 wt. %, and in still another embodiment from about 0.02 to about 3 wt. % based on total amine.

Suitable quaternary ammonium salts, quaternary phosphonium salts, and hexaalkylguanidinium salts include halide salts such as tetraethylammonium bromide, tetraethylammonium chloride, tetrapropylammonium bromide, tetrapropylammonium chloride, tetrabutylammonium bromide, tetrabutylammonium chloride, methyltributylammonium chloride, benzyltributylammonium chloride, benzyltriethylammonium chloride, benzyltrimethylammonium chloride, trioctylmethylammonium chloride, cetyldimethylbenzylammonium chloride, octyltriethylammonium bromide, decyltriethylammonium bromide, lauryltriethylammonium bromide, cetyltrimethylammonium bromide, cetyltriethylammonium bromide, N-laurylpyridinium chloride, N-laurylpyridinium bromide, N-heptylpyridinium bromide, tricaprylylmethylammonium chloride (sometimes known as ALIQUAT 336), methyltri-$C_8$–$C_{10}$-alkyl-ammonium chloride (sometimes known as ADOGEN 464), N,N,N',N',N'-pentaalkyl-alpha, omega-amine-ammonium salts such as disclosed in U.S. Pat. No. 5,821,322; tetrabutylphosphonium bromide, benzyltriphenylphosphonium chloride, triethyloctadecylphosphonium bromide, tetraphenylphosphonium bromide, triphenylmethylphosphonium bromide, trioctylethylphosphonium bromide, cetyltriethylphosphonium bromide, hexaalkylguanidinium halides, hexaethylguanidinium chloride, and the like, and mixtures thereof. Also included are hydroxides such as methyltributylammonium hydroxide.

Organic solvents substantially immiscible with water include those which in one embodiment are less than about 5 wt. %, and in another embodiment less than about 2 wt. % soluble in water under the reaction conditions. Suitable organic solvents include dichloromethane, trichloroethylene, tetrachloroethane, chloroform, 1,2-dichloroethane, toluene, xylene, trimethylbenzene, chlorobenzene, o-dichlorobenzene, and mixtures thereof. In a particular embodiment the solvent is dichloromethane.

For the first step (generation of resorcinol arylate polyester) the pH of the reaction mixture is maintained in some embodiments between about 3 and about 8.5, and in other embodiments between about 5 and about 8, throughout addition of the at least one dicarboxylic acid dichloride to the at least one resorcinol moiety. For the second step, the preferred pH range is 9.5–11.

Suitable reagents to maintain the pH include alkali metal hydroxides, alkaline earth hydroxides, and alkaline earth oxides. In some embodiments the reagents are potassium hydroxide and sodium hydroxide. In a particular embodiment the reagent is sodium hydroxide. The reagent to maintain pH may be included in the reaction mixture in any convenient form. In some embodiments said reagent is added to the reaction mixture as an aqueous solution simultaneously with the at least one dicarboxylic acid dichloride.

The temperature of the reaction mixture may be any convenient temperature that provides a rapid reaction rate and a resorcinol arylate-containing polymer substantially free of anhydride linkages. Convenient temperatures include those from about −20° C. to the boiling point of the water-organic solvent mixture under the reaction conditions. In one embodiment the reaction is performed at the boiling point of the organic solvent in the water-organic solvent mixture. In another embodiment the reaction is performed at the boiling point of dichloromethane.

Preferably, the total molar amount of acid chloride groups added to the reaction mixture is stoichiometrically deficient relative to the total molar amount of phenolic groups. This stoichiometric ratio is desirable so that hydrolysis of acid chloride groups is minimized, and so that nucleophiles such as phenolic and/or phenoxide may be present to destroy any adventitious anhydride linkages, should any form under the reaction conditions. The total molar amount of acid chloride groups includes the at least one dicarboxylic acid dichloride, and any mono-carboxylic acid chloride chain-stoppers and any tri- or tetra-carboxylic acid tri- or tetra-chloride branching agents which may be used. The total molar amount of phenolic groups includes resorcinol moieties, and any mono-phenolic chain-stoppers and any tri- or tetra-phenolic branching agents which may be used. The stoichiometric ratio of total phenolic groups to total acid chloride groups is in one embodiment about 1.5–1.01 to 1 and in another embodiment about 1.2–1.02 to 1.

In an embodiment, at least one chain-stopper (also referred to sometimes hereinafter as capping agent) may be present in the methods and compositions of the present invention. A purpose of adding at least one chain-stopper is to limit the molecular weight, thus providing polymer with controlled molecular weight and favorable processability. A chain-stopper may be at least one of mono-phenolic compounds, mono-carboxylic acid chlorides, and/or mono-chloroformates.

For example, mono-phenolic compounds suitable as chain stoppers include monocyclic phenols, such as phenol, $C_1$–$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms, preferably in which about 47 to 89% of the hydrogen atoms are part of methyl groups as described in U.S. Pat. No. 4,334,053. For some embodiments a mono-phenolic UV absorber is used as capping agent. Such compounds include 4-substituted-2-hydroxybenzophenones and their derivatives, aryl salicylates, monoesters of diphenols, such as resorcinol monobenzoate, 2-(2-hydroxyaryl)-benzotriazoles and their derivatives, 2-(2-hydroxyaryl)-1,3,5-triazines and their derivatives, and like compounds. In some embodiments mono-phenolic chain-stoppers are phenol, p-cumylphenol, and/or resorcinol monobenzoate.

Mono-carboxylic acid chlorides suitable as chain stoppers include monocyclic, mono-carboxylic acid chlorides, such as benzoyl chloride, $C_1$–$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof, polycyclic, mono-carboxylic acid chlorides, such as trimellitic anhydride chloride, and naphthoyl chloride; and mixtures of monocyclic and polycyclic mono-carboxylic acid chlorides. The chlorides of aliphatic monocarboxylic acids with up to 22 carbon atoms are also suitable. Functionalized chlorides of aliphatic monocarboxylic acids, such as acryloyl chloride and methacryoyl chloride, are also suitable. Suitable mono-chloroformates include monocyclic, mono-chloroformates, such as phenyl chloroformate, alkyl-substituted phenyl chloroformate, p-cumyl phenyl chloroformate, toluene chloroformate, and mixtures thereof.

In another embodiment, the invention may encompass the inclusion of at least one branching agent such as a trifunctional or higher functional carboxylic acid chloride and/or trifunctional or higher functional phenol. Such branching agents, if included, can typically be used in quantities of 0.005 to 1 mole %, based on dicarboxylic acid dichlorides or resorcinol moieties used, respectively. Suitable branching agents include, for example, trifunctional or higher carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, and trifunctional or higher phenols, such as phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2,4-dihydroxyphenyl)-propane, tetra-(4-[4-hydroxyphenylisopropyl]-phenoxy)-methane, 1,4-bis-[(4,4-dihydroxytriphenyl)methyl]-benzene. Phenolic branching agents may be introduced first with the resorcinol moieties while acid chloride branching agents may be introduced together with acid dichlorides.

Polymer Blends

The polymers and copolymers comprising thermally stable resorcinol arylate polyester chain members may be employed in blends with at least one other polymer, especially polycarbonates (hereinafter sometimes designated "PC"), polyesters, copolyestercarbonates, polyarylates, polyetherimides, polyphenylene ethers, and addition polymers. Related blends are disclosed in commonly owned U.S. Pat. No. 6,143,839. For example, such blends may be used for injection molding.

The polycarbonates in the blend compositions of the invention are, for the most part, similar in molecular structure to the carbonate blocks of the block copolyestercarbonate as described hereinabove, with bisphenol-A homo- and copolycarbonates generally being preferred in some embodiments. Polyesters are illustrated by poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly(cyclohexanedimethanol terephthalate), poly (cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), and especially poly(alkylene arenedioates), with poly(ethylene terephthalate) and poly(1,4-butylene terephthalate) being preferred in some embodiments.

Multilayer Articles

The thermostable, weatherable polymers of the present invention may be applied to substrates to provide protection against UV induced degradation. Thus, in another embodiment, the present invention comprises multilayer articles comprising a substrate layer and least one coating layer thereon, said coating layer comprising at least one polymer comprising structural units derived from at least one 1,3-dihydroxybenzene moiety, at least one aromatic dicarboxylic acid moiety, at least one bisphenol moiety, and at least one soft-block moiety and prepared by methods embodied in the present invention.

In the present context a multilayer article is one containing at least two layers. In an embodiment, the substrate comprises at least one thermoplastic polymer, a thermoset polymer, a cellulosic material, glass, ceramic, or metal. Optionally, the multilayer articles may further comprise an interlayer, for example an adhesive interlayer, between any substrate layer and any thermally stable polymer coating layer.

Multilayer articles of the invention include, but are not limited to, those which comprise a substrate layer and a coating layer of said thermally stable polymer; those which comprise a substrate layer with a coating layer of said thermally stable polymer on each side of said substrate layer; and those which comprise a substrate layer and at least one coating layer of said thermally stable polymer with at least one interlayer between a substrate layer and a coating layer. Any interlayer may be transparent, translucent, or opaque, and/or may contain an additive, for example a colorant or decorative material such as metal flake. If desired, an overlayer may be included over the coating layer of thermally stable polymer, for example to provide abrasion or scratch resistance. The substrate layer, coating layer of thermally stable polymer, and any interlayers or overcoating layers are often in contiguous superposed contact with one another.

Within the context of the present invention, it should be understood that any coating layer comprising a thermally stable polymer comprising RP-co-PC/soft-block members may also include polymer comprising o-hydroxy-benzophenone or analogous chain members resulting from Fries rearrangement of said resorcinol arylate chain members, for example after exposure of said coating layer to UV-light. Typically, a preponderance of any polymer comprising o-hydroxy-benzophenone or analogous chain members will be on that side or sides of said coating layer exposed to UV-light and will overlay in a contiguous superposed layer or layers that polymer comprising unrearranged resorcinol arylate chain members. If the exposed layer is worn away or otherwise removed, polymer comprising o-hydroxybenzophenone or analogous chain members is capable of regenerating or renewing itself from the resorcinol arylate-containing layer or layers, thus providing continuous protection for any UV-light sensitive layers.

In an embodiment, the coating of the present invention my further comprise a stabilizer additive. Such additives may have a beneficial effect on color despite the fact that polymers comprising resorcinol arylate polyester chain members and their Fries rearrangement products themselves protect against photoyellowing. In the present context a stabilizer additive is an additive which provides one or both of lower initial color or additional resistance to weathering, as measured for example by initial yellowness index (YI), or by resistance to yellowing and change in color, when compared to a similar coating without at least one stabilizer additive. In a particular embodiment the stabilizer additive comprises at least one auxiliary color stabilizer additive. In another particular embodiment the stabilizer additive comprises at least one auxiliary light stabilizer additive. In one embodiment the presence of at least one auxiliary UV absorber as stabilizer additive provides additional resistance to weathering, for example as measured by initial yellowness index (YI), or resistance to yellowing and change in color, when compared to a similar coating without at least one auxiliary UV absorber. Since resorcinol arylate-comprising polymers generate UV absorber in situ, it is unexpected that the addition of auxiliary UV absorber would affect the amount of color or yellowness generated.

The material of the substrate layer in the articles of this invention may include at least one thermoplastic polymer as described in commonly owned U.S. Pat. No. 6,306,507. Thermoplastic polymers include, but are not limited to, polycarbonates, particularly aromatic polycarbonates, polyacetals, polyarylene ethers, polyphenylene ethers, polyarylene sulfides, polyphenylene sulfides, polyimides, polyamideimides, polyetherimides, polyetherketones, polyaryletherketones, polyetheretherketones, polyetherketoneketones, polyamides, polyesters, liquid crystalline polyesters, polyetheresters, polyetheramides, polyesteramides, and polyestercarbonates (other than those employed for the coating layer, as defined hereinafter). In some embodiments polycarbonates and polyesters are preferred. A substrate layer may additionally contain art-recognized additives including, but not limited to, colorants, pigments, dyes, impact modifiers, stabilizers, color stabilizers, heat stabilizers, UV screeners, UV absorbers, flame retardants, fillers, flow aids, ester interchange inhibitors, and mold release agents.

Suitable polycarbonate substrates include homopolycarbonates comprising structural units of the type described for the organic carbonate blocks in the copolyestercarbonates of the invention. In some embodiments the polycarbonates are bisphenol A homo- and copolycarbonates. In various embodiments the weight average molecular weight of the initial polycarbonate ranges from about 5,000 to about 100,000; in other embodiments the weight average molecular weight of the initial polycarbonate ranges from about 25,000 to about 65,000.

The polycarbonate substrate may also be a copolyestercarbonate (other than that copolyestercarbonate employed for the coating layer as defined hereinafter). Such copolymers typically comprise, in addition to the organic carbonate units, ester units such as isophthalate and/or terephthalate. The copolyestercarbonates which find use as substrates in the instant invention and the methods for their preparation are well known in the art as disclosed in, for example, U.S. Pat. Nos. 3,030,331; 3,169,121; 3,207,814; 4,194,038; 4,156,069; 4,238,596; 4,238,597; 4,487,896; and 4,506,065.

Polyester substrates include, but are not limited to, poly (alkylene dicarboxylates), especially poly(ethylene terephthalate), poly(1,4-butylene terephthalate), poly (trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate). Also included are polyarylates as described hereinabove, illustrative examples of which include those comprising structural units derived from bisphenol A, terephthalic acid, and isophthalic acid.

Additional polymer substrates include homo- and copolymeric aliphatic olefin and functionalized olefin polymers (which are homopolymers and copolymers comprising structural units derived from aliphatic olefins or functionalized olefins or both), and their alloys or blends. Illustrative examples include, but are not limited to, polyethylene, polypropylene, thermoplastic polyolefin ("TPO"), ethylene-propylene copolymer, poly(vinyl chloride), poly(vinyl chloride-co-vinylidene chloride), poly(vinyl fluoride), poly (vinylidene fluoride), poly(vinyl acetate), poly(vinyl alcohol), poly(vinyl butyral), poly(acrylonitrile), acrylic polymers such as those of (meth)acrylamides or of alkyl (meth)acrylates such as poly(methyl methacrylate) ("PMMA"), and polymers of alkenylaromatic compounds such as polystyrenes, including syndiotactic polystyrene. In some embodiments the preferred addition polymers are polystyrenes and especially the so-called ABS and ASA copolymers, which may contain thermoplastic, non-elastomeric styrene-acrylonitrile side chains grafted on an elastomeric base polymer of butadiene and alkyl acrylate, respectively.

Blends of any of the foregoing polymers may also be employed as substrates. Typical blends include, but are not limited to, those comprising PC/ABS, PC/ASA, PC/PBT, PC/PET, PC/polyetherimide, PC/polysulfone, polyester/polyetherimide, PMMA/acrylic rubber, polyphenylene ether-polystyrene, polyphenylene ether-polyamide or polyphenylene ether-polyester. Although the substrate layer may incorporate other thermoplastic polymers, the above-described polycarbonates and/or addition polymers often constitute the major proportion thereof.

The substrate layer in the multilayer articles of this invention may also comprise at least one of any thermoset polymer. Suitable thermoset polymer substrates include, but are not limited to, those derived from epoxys, cyanate esters, unsaturated polyesters, diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, and isocyanates. In one embodiment of the invention the thermoset polymer substrate comprises a RIM material. In another embodiment of the invention the thermoset polymer substrate further comprises at least one thermoplastic polymer, such as, but not limited to, polyphenylene ether, polyphenylene sulfide, polysulfone, polyetherimide, or polyester. Said thermoplastic polymer is typically combined with thermoset monomer mixture before curing of said thermoset.

In one embodiment of the invention a thermoplastic or thermoset substrate layer also incorporates at least one filler and/or pigment. Illustrative extending and reinforcing fillers, and pigments include silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers, as well as colorants such as metal flakes, glass flakes and beads, ceramic particles, other polymer particles, dyes and pigments which may be organic, inorganic or organometallic. In another embodiment the invention encompasses multilayer articles comprising a filled thermoset substrate layer such as a sheet-molding compound (SMC).

The substrate layer may also comprise at least one cellulosic material including, but not limited to, wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

Multilayer articles encompassed by the invention also include those comprising at least one glass layer. Typically any glass layer is a substrate layer, although multilayer articles comprising a thermally stable polymer coating layer interposed between a glass layer and a substrate layer are also contemplated. Depending upon the nature of coating and glass layers, at least one adhesive interlayer may be beneficially employed between any glass layer and any thermally stable polymer coating layer. The adhesive interlayer may be transparent, opaque or translucent. For many applications it is preferred that the interlayer be optically transparent in nature and generally have a transmission of greater than about 60% and a haze value less than about 3% with no objectionable color.

Metal articles exposed to UV-light may exhibit tarnishing and other detrimental phenomena. In another embodiment the invention encompasses multilayer articles comprising at least one metal layer as substrate layer. Representative metal substrates include those comprising brass, aluminum, magnesium, chrome, iron, steel, copper, and other metals or alloys or articles containing them, which may require protection from UV-light or other weather phenomena. Depending upon the nature of coating and metal layers, at least one adhesive interlayer may be beneficially employed between any metal layer and any thermally stable polymer coating layer.

It is also within the scope of the invention for other polymers to be present which are miscible in at least some proportions with the coating layer of the present invention. Illustrative examples of at least partially miscible polymers include polyetherimide and polyesters such as PBT, PET, PTT, PEN, PBN, PETG, PCCD, and bisphenol A polyarylate. In one embodiment the coating layer polymer consists essentially of thermally stable resorcinol arylate polyesters, copolyesters, or copolyestercarbonates.

In one embodiment, application of the at least one coating layer may be performed by solvent-casting. In another embodiment application of said coating layer comprises fabrication of a separate sheet thereof followed by application to the second layer, or by simultaneous production of both layers, typically in a melt process. Thus, there may be employed such methods as thermoforming, compression molding, co-injection molding, coextrusion, overmolding, blow molding, multi-shot injection molding and placement of a film of the coating layer material on the surface of the second layer followed by adhesion of the two layers, typically in an injection molding apparatus; e.g., in-mold decoration, or in a hot-press. These operations may be conducted under art-recognized conditions.

The articles of this invention are typically characterized by the usual beneficial properties of the substrate layer, in addition to weatherability as may be evidenced by such properties as improved initial gloss, improved initial color, improved resistance to ultraviolet radiation and maintenance of gloss, improved impact strength, and resistance to organic solvents encountered in their final applications. Depending upon such factors as the coating layer/substrate combination, the multilayer articles may possess recycling capability, which makes it possible to employ the regrind material as a substrate for further production of articles of the invention.

EXAMPLES

The invention is illustrated by the following, non-limiting examples. All parts are by weight unless otherwise designated. Molecular weight values for polymeric samples were determined by gel permeation chromatography (GPC) using 3% isopropanol/chloroform eluent at 0.70 milliliters (ml) per minute (min) on a Polymer Labs Mixed C size exclusion column held at 40° C., and calibrated using polystyrene standards, and analyzed with Turbogel software.

Example 1

Methods of Soft-Block Incorporation into RP-co-PC

Depending on the choice of soft-block material, a variety of processes are available for incorporation of a soft-block. The results of several experiments are summarized in Table 1 and further described below.

General methods for preparation of polymers of the present invention are provided as Examples 2–5, below. For each of the general procedures described as examples 2–5, reactions were performed using a polycondensation reactor comprising a one liter, four neck Morton flask equipped with mechanical stirrer, reflux condenser, pH probe, acid chloride solution inlet and base solution inlet. Additionally, two peristaltic pumps were used for metered delivery of acid chloride and base solutions, respectively.

A. Incorporation of Polyethylene Glycol Oligomers (Samples 2–7)

Incorporation of polyethylene glycol oligomers was evaluated as a means for incorporation soft-block moieties into poly(resorcinol phthalate co-polycarbonate (RP-co-PC) polymers (Table 1, Entries 2–7). In these experiments, a hydroxy-terminated oligomer was pre-reacted with the iso/terephthaloyl chloride in $CH_2C_2$ using stoichiometric triethylamine, forming a polyethylene glycol oligomer terminated with an iso/terephthaloyl chloride end group as shown in Equation 2, above. Resorcinol was then added, and the remainder of the RP-co-PC polymerization carried out under usual interfacial polymerization conditions. As seen from the data in Table 1, lower molecular weight (Mw) oligomers were very effective at reducing the Tg of the polymer, as well as reducing the melt viscosity and flow energy. In addition, the molded polymers were clear and nearly colorless. Lower molecular weight polyethylene glycols (e.g. DEG, TEG, and PEG 300) seemed preferable since the higher molecular weight PEGs led to formation of very high molecular weight species, with a trimodal polymer distribution resulting for PEG 3400.

B. Bisphenol A Functionalized with a Long Chain Ester (Samples 8–10)

A bisphenol A functionalized with a long chain ester was incorporated into the RP-co-PC by replacing part of the BPA normally used with the ester-bisphenol shown as Formula XIII above (see e.g., Table 1, samples 8–10). This material was effective at reducing Tg, as well as increasing flow and reducing flow energy, but larger amounts by weight were necessary to achieve the changes. A control experiment comparing use of 5% of the ester-bisphenol in polycarbonate showed a large decrease in Tg, along with an increase in flow. However, the polymer was hazy and dark after processing (Entry 21, compared to Entry 22, without soft-block). Purification of the ester diphenol may alleviate the color problem.

C. Aliphatic Diacid Chlorides (Samples 11–13)

Soft-block moieties were also introduced as esters by co-reaction of aliphatic diacid chlorides along with the iso/terephthaloyl chloride (Entries 11–13). A dramatic drop in Tg was noted for these copolymers, although anhydrides were formed to a somewhat larger extent.

D. Chainstopper with an Lengthy Aliphatic Tail (Samples 15 and 16)

One of the simplest methods to incorporate a soft-block polymer used a chainstopper with an lengthy aliphatic tail. Surprisingly, this technique was fairly effective. Either p-nonylphenol or p-dodecylphenol were substituted for the normal chainstopper (phenol) in a normal RP-co-PC polymerization reaction (Equation 1, above). As shown in Table 1, entries 15 and 16, only a modest reduction in glass transition temperature (Tg) was observed, but a large decrease in melt viscosity and flow energy for the nonyl phenol resulted.

E. Other Methods to Incorporate Soft-block Groups (Samples 14, 17–20)

Incorporation of other long chain diols as soft-block moieties was investigated. A polybutadienediol (Table 1, sample 14) was not particularly effective but a poly(tetrahydrofuran-diol) proved to be effective at reducing viscosity as well as Tg, even at a level of only 2% by weight (Table 1, sample 17) and an o,p-mixture of citronellyl citronellate diphenol (CCDP) was also somewhat effective at reducing sample viscosity. Siloxane/diol oligomers were effective in some cases (see e.g. Table 1, samples 18 and 19).

TABLE 1

Soft-block incorporation into 80/20 RP-co-PC.

| Sample No. | Soft-block | % | Mw | Tg | $-\Delta Tg/wt\%$ | η at 275 | η at 250 | E | Character |
|---|---|---|---|---|---|---|---|---|---|
| 1 | none (control) | na | 43.58 | 143.8 | 0 | 24704 | 81242 | 113.5 | clear |
| 2 | DEG | 2 | 37.17 | 136 | 3.9 | 15581 | 45003 | 101.1 | clear |
| 3 | TEG | 2 | 39.79 | 133.4 | 5.2 | 16535 | 48023 | 101.6 | clear |
| 4 | PEG300 | 2 | 38.76 | 135 | 4.5 | 16051 | 47907 | 104.3 | clear |
| 5 | PEG600 | 2 | 59.6 | 135 | 4.4 | 23774 | 72969 | 106.9 | clear, high Mw tail |
| 6 | PEG1000 | 2 | 67.2 | 136 | 3.9 | 25824 | 77788 | 105.1 | clear, high Mw tail |
| 7 | PEG3400 | 2 | 48.77 | 133 | 5.4 | 2328 | 6654 | 100.1 | clear, trimodal |
| 8 | C18-BPA | 2 | 44.26 | 139 | 2.4 | 25894 | 77111 | 104 | clear, yellow |
| 9 | C18-BPA | 5 | 43.65 | 135 | 1.8 | 20180 | 62280 | 107.5 | clear, yellow |
| 10 | C18-BPA | 10 | 41.94 | 126 | 1.8 | 14198 | 37733 | 93.2 | clear, yellow |
| 11 | adip | 5 | — | 130 | 2.8 | 9359 | 28046 | 104.6 | clear |
| 12 | sebac | 5 | 42.79 | 127 | 3.4 | 19149 | 51784 | 94.8 | clear |
| 13 | dodec | 5 | — | 128 | 3.2 | 14847 | 41765 | 98.6 | clear |
| 14 | PBD | 2 | 46.63 | — | nd | 19558 | 56325 | 100.8 | clear |
| 15 | NonylPhenol | 3.97 | 40.29 | 141 | 0.71 | 15318 | 44815 | 102.4 | clear |
| 16 | DodecylPhenol | 4.72 | 42.75 | 139.3 | 0.95 | 20348 | 65279 | 112.2 | clear |
| 17 | PTHF | 2 | 38.75 | 134.5 | 4.7 | 16423 | 47048 | 100.3 | |
| 18 | ED10E | 2 | 40.46 | 138.8 | 2.5 | 24541 | 81899 | 114.9 | |
| 19 | EMME | 2 | 38.39 | 136.2 | 3.75 | 13541 | 43048 | 110.3 | |
| 20 | CCDP | 2 | | | | 17474 | 56113 | 111.1 | |

TABLE 1-continued

Soft-block incorporation into 80/20 RP-co-PC.

| Sample No. | Soft-block | % | Mw | Tg | $-\Delta Tg$/wt % | $\eta$ at 275 | $\eta$ at 250 | E | Character |
|---|---|---|---|---|---|---|---|---|---|
| 21 | c18-BPA-PC | 5 | 46.75 | 122 | 4.6 | 4242 | 9088 | 73.6 | hazy, dark |
| 22 | Lexan HF | na | 46.9 | 144.5 | 0 | 7020 | 21050 | | calculated $\eta$ |

DEG = diethylene glycol;
TEG = tetraethylene glycol;
PEG # = polyethylene glycol with Avg Mw #;
adip = adipoyl chloride;
sebac = sebacoyl chloride;
dodec = dodecanoyl chloride;
PBD = polybutadienediol;
pTHF = poly(tetrahydrofuran) diol;
ED10E = α,ω-(3-(4-hydroxy-3-methoxy)-propyl)-deca(dimethylsiloxane);
EMME = 1,3-(bis(3-(4-hydroxy-3-methoxy)-propyl)-1,1,3,3-tetramethyl disiloxane;
CCDP = o,p-mixture of citronellyl citronellate diphenol;
C18-BPA-PC = n-octadecyl-4,4-bis(4-hydroxyphenyl)valerate;
Lexan HF = High Flow grade of polycarbonate.

Example 2

General Procedure for the Incorporation of Aliphatic Diols, Including Polyethylene Glycols, Poly(tetrahydrofuran)diol; CCDP, and Siloxane/diol Oligomers.

The following were added to a dry polycondensation reactor: (a) diol (0.96 g, 2 wt. % based on polyarylate oligomer weight, 960/FW mmol); (b) triethylamine (0.890 mL, 6.4 mmol); (c) 4-N,N-dimethylaminopyridine (10 mg); and (d) dry dichloromethane (5 mL). A solution of 2 equivalents of acid chloride in 2 ml of dry dichloromethane was then added and the mixture was stirred for 5 minutes. The reactor was then charged with resorcinol (220 mmol less the number of mmol diol; to keep the total number of hydroxy groups constant), phenol (813 mg, 3.2 mol %) and water (36 mL). The acid chloride reservoir was charged with a solution of terephthaloyl chloride and isophthaloyl chloride (20.30 g of each) in dichloromethane and brought to a total volume of 90 mL. Dichloromethane (250 ml) was added to the reactor and the polycondensation was conducted using methods previously described (U.S. Pat. No. 6,294,647). To the polyarylate solution was then added BPA (11.414 g, 50 mmol), water (50 mL) dichloromethane (125 mL) and the mixture was reacted with phosgene as usual (U.S. Pat. No. 6,294,647).

Example 3

General Procedure for the Incorporation of Aliphatic Acid Dichlorides

The following were added to a polycondensation reactor: (a) resorcinol (24.22 g, 220 mmol); (b) water (36 mL), (c) dichloromethane (250 mL); and (d) triethylamine (0.890 mL, 6.4 mmol). Aliphatic acid chloride (if not otherwise indicated, 2.4 g, 5 wt. %, 2400/FW mmol) was added to the stirred mixture while adding the corresponding stoichiometric amount of NaOH (2.5 ml of 33 wt % solution, unless otherwise specified). The mixture was stirred for 5 minutes. A solution of terephthaloyl chloride and isophthaloyl chloride (100 mmol each less the number mmol of aliphatic acid chloride) was then added to the acid chloride reservoir and the polycondensation was conducted as described previously (see e.g., U.S. Pat. No. 6,294,647). BPA, water, dichloromethane and phosgene were then added as in Example 2.

Example 4

General Procedure for the use of Alkylphenols as Chainstoppers

A polycondensation reactor was charged with resorcinol (24.22 g, 220 mmol), alkylphenol (3.2 mole %, based on acid chloride), water (36 mL), dichloromethane (250 mL), and triethylamine (0.89 mL, 6.4 mmol). The acid chloride reservoir was charged with a solution of terephthaloyl chloride and isophthaloyl chloride (20.30 g of each) in dichloromethane and brought to a total volume of 90 ml. Polycondensation was conducted as described above, by adding acid chloride and aqueous NaOH at such a rate to maintain a pH of 7.0. To the polyarylate solution was then added BPA (11.414 g, 50 mmol), water (50 ml) dichloromethane (125 ml) and the mixture was reacted with phosgene as previously described (U.S. Pat. No. 6,294,647).

Example 5

General Procedure for the use of alkyl bisphenols as Soft-Blocks:

A polycondensation reactor was charged with resorcinol (24.22 g, 220 mmol), phenol (0.96 g, 3.2 mole %, based on acid chloride), an alkylbisphenol (amount from Table 1), water (36 mL), dichloromethane (250 mL), and triethylamine (0.89 mL, 6.4 mmol). The acid chloride reservoir was charged with a solution of terephthaloyl chloride and isophthaloyl chloride (20.30 g of each) in dichloromethane and brought to a total volume of 90 ml. Polycondensation was conducted as described for Example 4, by adding acid chloride and aqueous NaOH at such a rate to maintain a pH of ~7.0. To the polyarylate solution was then added BPA (11.414 g, 50 mmol), water (50 ml) dichloromethane (125 ml) and the mixture was reacted with phosgene as previously described for Example 4.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All U.S. Patents cited herein are incorporated herein by reference.

What is claimed is:

1. A resorcinol ester polycarbonate polymer having good flow characteristics comprising:
   (a) a resorcinol arylate polyester chain, wherein the resorcinol arylate polyester chain is substantially free of anhydride linkages such that the resorcinol arylate polyester chain comprises the condensation of at least one resorcinol moiety with at least one dicarboxylic acid dichloride while maintaining the pH between about 3 and 8.5 through the presence of an acid acceptor, wherein the total molar amount of acid chloride groups is stoichiometrically deficient relative to the total molar amount of phenolic groups on the resorcinol moiety;
   (b) at least one organic carbonate group; and
   (c) at least one soft-block chemical moiety, wherein the at least one soft-block chemical moiety is added in an amount to provide a reduction in melt viscosity and flow energy for the polymer.

2. The polymer of claim 1, wherein the dicarboxylic acid residues comprise a monocyclic aromatic moiety or a polycyclic aromatic moiety.

3. The polymer of claim 1, wherein the resorcinol moiety used to generate the resorcinol arylate polyester chain comprises compounds of Formula I

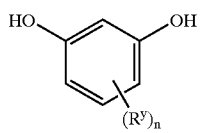

Formula I wherein $R^y$ is at least one of $C_{1-12}$ alkyl or halogen, and n is 0–3.

4. The polymer of claim 3, wherein the resorcinol moiety used to generate the resorcinol arylate polyester chain comprises unsubstituted resorcinol, 2-methyl resorcinol, and mixtures thereof.

5. The polymer of claim 1, wherein the at least one dicarboxylic acid dichloride comprises isophthaloyl dichloride, terephthaloyl dichloride, naphthalene-2,6-dicarboxylic acid dichloride and mixtures thereof.

6. The polymer of claim 1, wherein the resorcinol ester polycarbonate polymer backbone comprises the structure as illustrated in Formula IV:

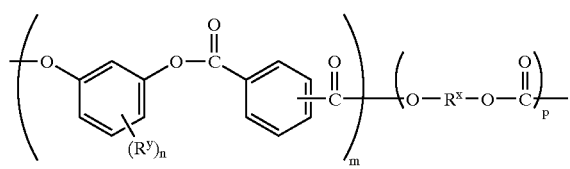

Formula IV wherein $R^y$ is at least one of $C_{1-12}$ alkyl or halogen, n is 0–3, m is at least about 8, p is at least about 10, and $R^x$ is at least one divalent organic radical, wherein the organic radical comprises an aromatic, aliphatic or cycloaliphatic radical.

7. The polymer of claim 6, wherein $R^x$ comprises a divalent organic radical derived from a bisphenol of Formula VIII

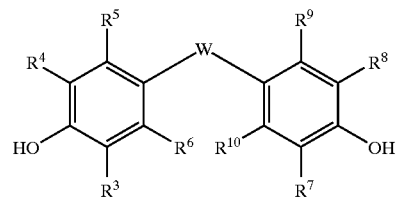

Formula VIII wherein $R^3$–$R^{10}$ are independently a hydrogen atom, halogen atom, nitro group, cyano group, $C_1$–$C_{30}$ alkyl group, $C_4$–$C_{30}$ cycloalkyl group, or $C_6$–$C_{30}$ aryl group, a $C_1$–$C_{30}$ alkoxy, $C_4$–$C_{30}$ cycloalkoxy or $C_6$–$C_{30}$ aryloxy; W is a direct bond, or an oxygen atom, sulfur atom, C=O group, $SO_2$ group, $C_1$–$C_{20}$ aliphatic radical, $C_6$–$C_{20}$ aromatic radical, $C_6$–$C_{20}$ cycloaliphatic radical, or the group,

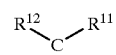

wherein $R^{11}$ and $R^{12}$ are independently a hydrogen atom, $C_1$–$C_{20}$ alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ arylalkyl, $C_5$–$C_{20}$ cycloalkyl groups or a combination thereof.

8. The polymer of claim 1, wherein the soft-block moiety comprises structural units of Formulas IX, X, or XI:

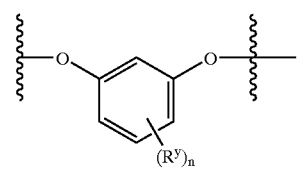

Formula IX

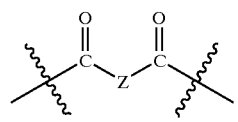

Formula X

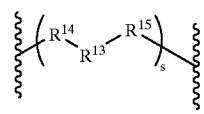

Formula XI wherein $R^y$ is at least one of $C_{1-12}$ alkyl or halogen, and n is 0–3; Z is a divalent aliphatic radical, or a $C_{3-20}$ straight chain alkylene; and s ranges up to and including 10, $R^{13}$ is a $C_{3-20}$ straight chain alkylene, a $C_{3-10}$ branched alkylene, a $C_{4-10}$ cyclo- or bicycloalkylene group, $CH_2(CH_2OCH_2)_rCH_2$, where r is 1–20, or a polyether comprising the formula $CH_2([CH_2]_bO[CH_2]_b)_cCH_2$, where b is 1–3 and c is 1–10; and $R^{14}$ and $R^{15}$ each independently represent

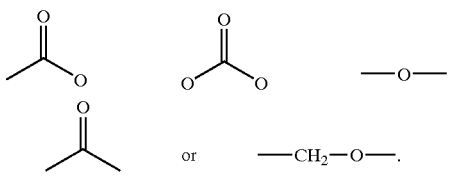

9. The polymer of claim 1, wherein the soft-block moiety comprises an aliphatic ester.

10. The polymer of claim 9, wherein the aliphatic ester is introduced into the polymer by substitution of an aliphatic acid or diacid chloride for a portion of a dicarboxylic acid dichloride used to produce the resorcinol arylate chain.

11. The polymer of claim 10, wherein the soft-block moiety is derived from at least one of carboxy-terminated polybutadiene, carboxy-terminated butadiene-acrylonitrile copolymer, adipoyl chloride, sebacoyl chloride, or dodecanoyl chloride.

12. The polymer of claim 1, wherein the soft-block moiety is derived from at least one species comprising at least one hydroxy end-group.

13. The polymer of claim 12, wherein the hydroxy terminated soft-block moiety is substituted for a portion of the resorcinol moiety used to produce the resorcinol arylate chain.

14. The polymer of claim 1, wherein the soft-block moiety is derived from oligomers of at least one of diethylene glycol, tetraethylene glycol, or a low molecular weight polyethylene glycol.

15. The polymer of claim 1, wherein the soft-block moiety is derived from at least one of hydroxy-terminated aliphatic polyester or polycarbonate oligomer.

16. The polymer of claim 1, wherein the soft-block moiety is derived from poly(tetrahydrofuran)diol.

17. The polymer of claim 1, wherein the soft-block moiety is derived from an o,p-mixture of citronellyl citronellate diphenol (CCDP).

18. The polymer of claim 1, wherein the soft-block moiety is derived from a siloxane oligomer as shown in Formula XII, Formula XII

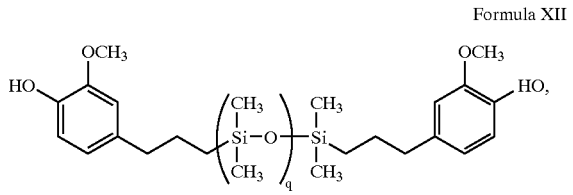

where q is 1–99; or a siloxane oligomer as shown in Formula XVI, wherein the moiety Ar is derived from a dihydroxy-substituted aromatic hydrocarbon and x has a value of about 10 to about 100:

Formula XVI

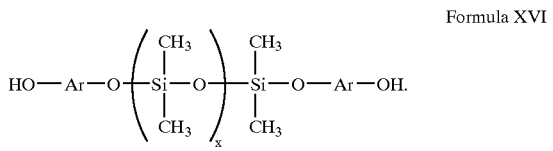

19. The polymer of claim 18, wherein the siloxane soft-block moiety of Formula XII comprises α, ω(3-(4-hydroxy-3-methoxy)-propyl)-deca(dimethylsiloxane)(ED10E) or 1,3 (bis-3-(4-hydroxy-3-methoxy)-propyl)-1,1,3,3,-tetramethyl disiloxane (EMME).

20. The polymer of claim 18, wherein the Ar moiety of the siloxane soft-block moiety of Formula XVI is derived from bisphenol A and x has a value of about 30 to about 100.

21. The polymer of claim 1, wherein the soft-block moiety is introduced into the polymer during synthesis of the organic carbonate group.

22. The polymer of claim 1, wherein the soft-block moiety is derived from a bisphenol functionalized with an aliphatic ester.

23. The polymer of claim 22, wherein the bisphenol functionalized with an aliphatic ester has the structure as shown in Formula XIII Formula XIII

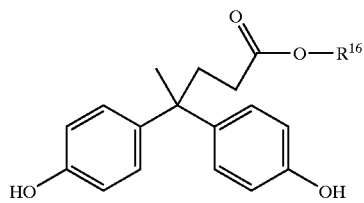

where $R^{16}$ comprises a $C_{4-20}$ aliphatic radical.

24. The polymer of claim 1, wherein the soft-block moiety comprises an aliphatic moiety introduced into the polymer using a chain stopper comprising an aliphatic tail.

25. The polymer of claim 24, wherein the soft-block moiety is derived from the structure of Formula XIV, Formula XIV

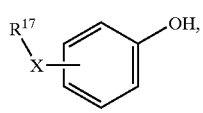

where X is —O—, —CH$_2$— and $R^{17}$ is $C_6$–$C_{20}$ alkyl.

26. The polymer of claim 1, wherein the soft-block moiety comprises 0.1–25% by weight of the polymer.

27. The polymer of claim 1, wherein the soft-block moiety comprises 1–20% by weight of the polymer.

28. The polymer of claim 1, wherein the soft-block moiety comprises 2–10% by weight of the polymer.

29. The polymer of claim 1, wherein the reduction in melt viscosity upon addition of the soft-block moiety comprises greater than 10% at 250° C.

30. The polymer of claim 1, wherein the reduction in melt viscosity upon addition of the soft-block moiety comprises greater than 20% at 250° C.

31. The polymer of claim 1, wherein the glass transition temperature (Tg) is greater than 125° C.

32. The polymer of claim 1, wherein the glass transition temperature (Tg) is greater than 130° C.

33. A resorcinol ester polycarbonate polymer having good flow characteristics comprising at least one soft-block moiety incorporated into a resorcinol phthalate-co-bisphenol A-polycarbonate copolymer substantially free of anhydride linkages, such that the resorcinol arylate polyester chain comprises the condensation of at least one resorcinol moiety with at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups on the resorcinol moiety, and wherein the resorcinol phthalate-co-bisphenol A-polycarbonate copolymer comprises the structural unit of Formula IV, Formula IV

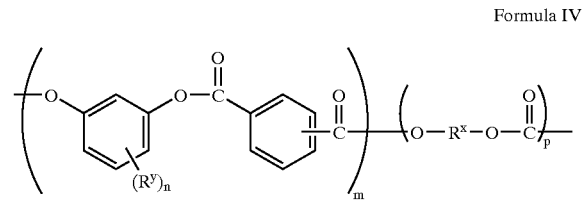

where $R^y$ is at least one of $C_{1-12}$ alkyl or halogen, n is 0–3, m is at least about 8, p is at least about 10, and $R^x$ is at least one divalent organic radical, wherein the organic radical comprises at least one aromatic, aliphatic, or cycloaliphatic radical; and the soft-block comprises Formula XI:

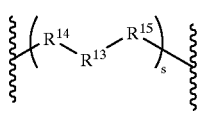

Formula XI wherein s ranges up to and including 10; $R^{13}$ is a $C_{3-20}$ straight chain alkylene, a $C_{3-10}$ branched alkylene, a $C_{4-10}$ cyclo- or bicycloalkylene group, a polymer of ethylene glycol comprising the formula $CH_2(CH_2OCH_2)_rCH_2$, where r is 1–20, or a polyether comprising the formula $CH_2([CH_2]_b O[CH_2]_b)_c CH_2$, where b is 1–3 and c is 1–10; and $R^{14}$ and $R^{15}$ each independently represent

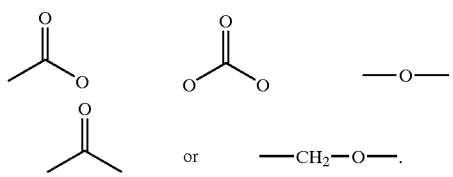

and wherein the at least one soft-block chemical moiety is added in an amount to provide a reduction in melt viscosity and flow energy for the polymer.

34. The polymer of claim 33, wherein $R_x$ comprises a divalent organic radical derived from a bisphenol of Formula VIII

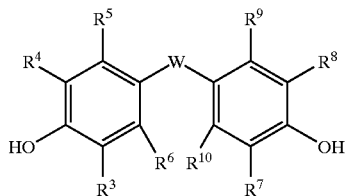

Formula VIII wherein $R^3$–$R^{10}$ are independently a hydrogen atom, halogen atom, nitro group, cyano group, $C_1$–$C_{30}$ alkyl group, $C_4$–$C_{30}$ cycloalkyl group, or $C_6$–$C_{30}$ aryl group, a $C_1$–$C_{30}$ alkoxy, $C_4$–$C_{30}$ cycloalkoxy or $C_6$–$C_{30}$ aryloxy; W is a direct bond, or an oxygen atom, sulfur atom, C=O group, $SO_2$ group, $C_1$–$C_{20}$ aliphatic radical, $C_6$–$C_{20}$ aromatic radical, $C_6$–$C_{20}$ cycloaliphatic radical, or the group,

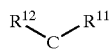

wherein $R^{11}$ and $R^{12}$ are independently a hydrogen atom, $C_1$–$C_{20}$ alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ arylalkyl, $C_5$–$C_{20}$ cycloalkyl groups or a combination thereof.

35. The polymer of claim 33, wherein the soft-block comprises an aliphatic polyester or a polycarbonate oligomer.

36. The polymer of claim 33, wherein the soft-block comprises a polyethylene oligomer.

37. The polymer of claim 33, wherein the soft-block is derived from poly(tetrahydrofuran)diol.

38. A resorcinol ester polycarbonate polymer having good flow characteristics comprising at least one soft-block moiety incorporated into a resorcinol phthalate-co-bisphenol A-polycarbonate copolymer substantially free of anhydride linkages, such that the resorcinol arylate polyester chain comprises the condensation of at least one resorcinol moiety with at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups on the resorcinol moiety, and wherein the resorcinol phthalate-co-bisphenol A-polycarbonate copolymer comprises the structural unit of Formula IV

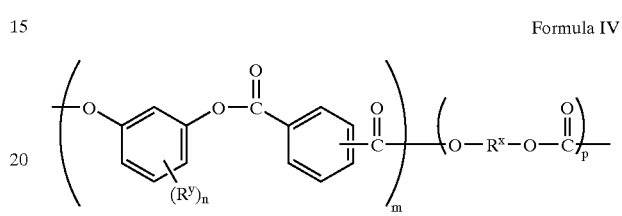

Formula IV where $R^y$ is at least one of $C_{1-2}$ alkyl or halogen, n is 0–3, m is at least about 8, p is at least about 10, and $R^x$ is at least one divalent organic radical, wherein the organic radical comprises an aromatic, aliphatic, or cycloaliphatic radical; and the soft-block comprises Formula X,

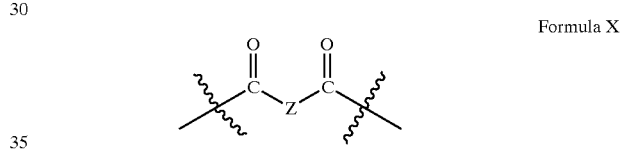

Formula X wherein Z is a divalent aliphatic radical or a $C_{3-20}$ straight chain alkylene, and wherein the at least one soft-block chemical moiety is added in an amount to provide a reduction in melt viscosity and flow energy for the polymer.

39. The polymer of claim 1, wherein the soft-block comprises an aliphatic ester having at least six carbon atoms.

40. A resorcinol ester polycarbonate polymer having good flow characteristics comprising at least one soft-block moiety incorporated into a resorcinol phthalate-co-bisphenol A-polycarbonate copolymer substantially free of anhydride linkages, wherein the resorcinol phthalate-co-bisphenol A-polycarbonate copolymer comprises the structural unit of Formula IV

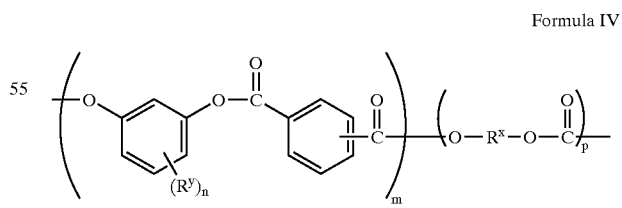

Formula IV where $R^y$ is at least one of $C_{1-12}$ alkyl or halogen, n is 0–3, m is at least about 8, p is at least about 10, and $R^x$ is at least one divalent organic radical, wherein the organic radical comprises an aromatic, aliphatic, or cycloaliphatic radical; and the soft-block is derived from a siloxane oligomer as shown in Formula XII Formula XII

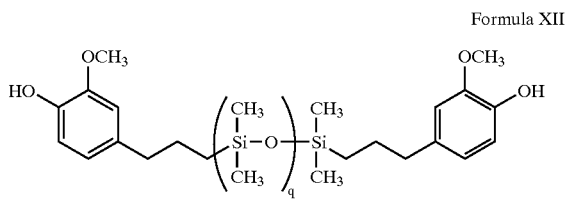

where q is 1–99; or a siloxane oligomer as shown in Formula XVI, wherein the moiety Ar is derived from bisphenol A and x has a value of about 30 to about 100:

Formula XVI

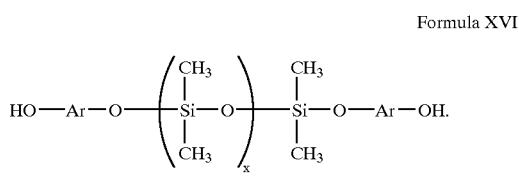

41. A resorcinol ester polycarbonate polymer having good flow characteristics comprising at least one soft-block moiety incorporated into a resorcinol phthalate-co-bisphenol A-polycarbonate copolymer substantially free of anhydride linkages, such that the resorcinol arylate polyester chain comprises the condensation of at least one resorcinol moiety with at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups on the resorcinol moiety, and wherein the resorcinol phthalate-co-bisphenol A-polycarbonate copolymer comprises the structural unit of Formula IV Formula IV

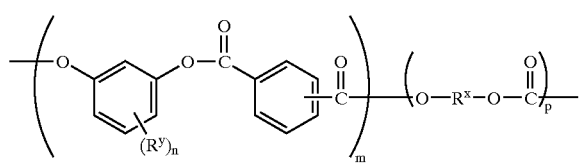

where $R^y$ is at least one of $C_{1-12}$ alkyl or halogen, n is 0–3, m is at least about 8, p is at least about 10, and $R^x$ is at least one divalent organic radical, wherein the organic radical comprises an aromatic, aliphatic, or cycloaliphatic radical; and the soft-block is derived from a bisphenol functionalized with an aliphatic ester as shown in Formula XIII, Formula XIII

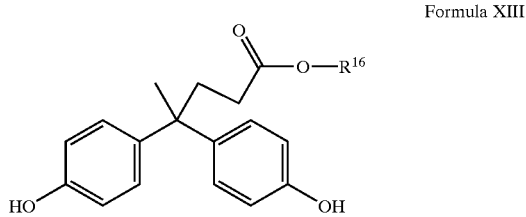

where $R^{16}$ comprises a $C_{4-20}$ aliphatic radical, and wherein the at least one soft-block chemical moiety is added in an amount to provide a reduction in melt viscosity and flow energy for the polymer.

42. A resorcinol ester polycarbonate polymer having good flow characteristics comprising at least one soft-block moiety incorporated into a resorcinol phthalate-co-bisphenol A-polycarbonate copolymer substantially free of anhydride linkages, such that the resorcinol arylate polyester chain comprises the condensation of at least one resorcinol moiety with at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups on the resorcinol moiety, and wherein the resorcinol phthalate-co-bisphenol A-polycarbonate copolymer comprises the structural unit of Formula IV, Formula IV

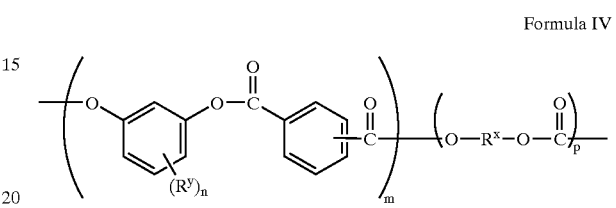

where $R^y$ is at least one of $C_{1-12}$ alkyl or halogen, n is 0–3, m is at least about 8, p is at least about 10, and $R^x$ is at least one divalent organic radical, wherein the organic radical comprises an aromatic, aliphatic, or cycloaliphatic radical; and the soft-block is derived from an aliphatic moiety introduced into the polymer using a chainstopper comprising an aliphatic tail shown in Formula XIV, Formula XIV

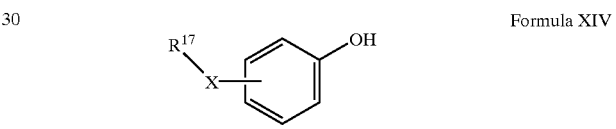

wherein $R^{17}$ comprises a $C_6$–$C_{20}$ alkyl and X comprises —O— or —CH$_2$—, and wherein the at least one soft-block chemical moiety is added in an amount to provide a reduction in melt viscosity and flow energy for the polymer.

43. A method of making a resorcinol ester polycarbonate polymer having good flow characteristics comprising:
(a) generating a resorcinol arylate polyester chain, wherein the resorcinol arylate polyester chain is substantially free of anhydride linkages such that the resorcinol arylate polyester chain comprises the condensation of at least one resorcinol moiety with at least one dicarboxylic acid dichloride while maintaining the pH between about 3 and 8.5 through the presence of an acid acceptor, wherein the total molar amount of acid chloride groups is stoichiometrically deficient relative to the total molar amount of phenolic groups on the resorcinol moiety;
(b) conducting an interfacial polymerization in the presence of at least one divalent organic radical to generate a poly(resorcinol arylate-co-polycarbonate) comprising an organic carbonate group; and
(c) incorporating at least one soft-block chemical moiety into the polymer during step (a) or step (b) or both, wherein the at least one soft-block chemical moiety is added in an amount to provide a reduction in melt viscosity and flow energy for the polymer.

44. The method of claim 43, wherein the dicarboxylic acid residues comprise a monocyclic aromatic moiety or a polycyclic aromatic moiety.

45. The method of claim 43, wherein the stoichiometric ratio of total phenolic groups to total acid chloride groups for generation of the resorcinol arylate polyester chain is 1.5–1.01:1.

46. The method of claim 43, wherein the resorcinol moiety used to generate the resorcinol arylate polyester chain comprises compounds of Formula I,

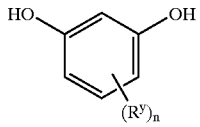

Formula I wherein $R^y$ is at least one of $C_{1-12}$ alkyl or halogen, and n is 0–3.

47. The method of claim 46, wherein the resorcinol moiety used to generate the resorcinol arylate polyester chain comprises unsubstituted resorcinol, 2-methyl resorcinol, and mixtures thereof.

48. The method of claim 44, wherein the at least one dicarboxylic acid dichloride comprises isophthaloyl dichloride, terephthaloyl dichloride, naphthalene-2,6-dicarboxylic acid dichloride and mixtures thereof.

49. The method of claim 43, wherein the resorcinol ester polycarbonate polymer comprises structure as illustrated in formula IV:

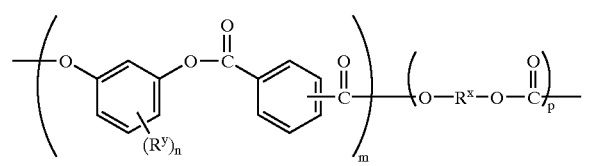

Formula IV where $R^y$ is at least one of $C_{1-12}$ alkyl or halogen, n is 0–3, m is at least about 8, p is at least about 10, and $R^x$ is at least one divalent organic radical, wherein the organic radical comprises an aromatic, aliphatic, or cycloaliphatic radical.

50. The method of claim 49, wherein $R^x$ comprises a divalent organic radical derived from a bisphenol of Formula VIII

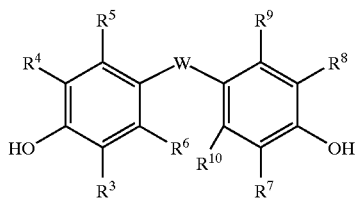

Formula VIII wherein $R^3$–$R^{10}$ are independently a hydrogen atom, halogen atom, nitro group, cyano group, $C_1$–$C_{30}$ alkyl group, $C_4$–$C_{30}$ cycloalkyl group, or $C_6$–$C_{30}$ aryl group, a $C_1$–$C_{30}$ alkoxy, $C_4$–$C_{30}$ cycloalkoxy or $C_6$–$C_{30}$ aryloxy; W is a direct bond, or an oxygen atom, sulfur atom, C=O group, $SO_2$ group, $C_1$–$C_{20}$ aliphatic radical, $C_6$–$C_{20}$ aromatic radical, $C_6$–$C_{20}$ cycloaliphatic radical, or the group,

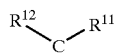

wherein $R^{11}$ and $R^{12}$ are independently a hydrogen atom, $C_1$–$C_{20}$ alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

51. The method of claim 43, wherein the soft-block moiety comprises structural units of Formulas IX, X or XI:

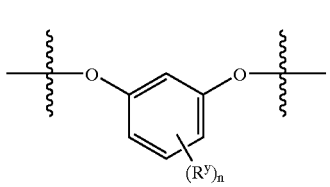

Formula IX

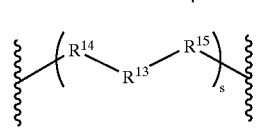

Formula X

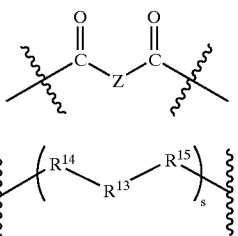

Formula XI wherein $R^y$ is at least one of $C_{1-12}$ alkyl or halogen, and n is 0–3; Z is a divalent aliphatic radical, or a $C_{3-20}$ straight chain alkylene; and s ranges up to and including 10, $R^{13}$ is a $C_{3-20}$ straight chain alkylene, a $C_{3-10}$ branched alkylene, a $C_{4-10}$ cyclo- or bicycloalkylene group, $CH_2(CH_2OCH_2)_r CH_2$, where r is 1–20, or a polyether comprising the formula $CH_2([CH_2]_bO[CH_2]_b)_cCH_2$, where b is 1–3 and c is 1–10; and $R^{14}$ and $R^{15}$ each independently represent

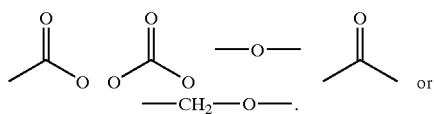

or

52. The method of claim 43, wherein the soft-block moiety comprises an aliphatic ester.

53. The method of claim 52, wherein the aliphatic ester is introduced into the polymer by substitution of an aliphatic acid or diacid chloride for a portion of a dicarboxylic acid dichloride used to produce the resorcinol arylate chain.

54. The method of claim 52, wherein the soft-block moiety is derived from at least one of carboxy-terminated polybutadiene, carboxy-terminated butadiene-acrylonitrile copolymer, adipoyl chloride, sebacoyl chloride, or dodecanoyl chloride.

55. The method of claim 43, wherein the soft-block moiety is derived from at least one species comprising at least one hydroxy end-group.

56. The method of claim 55, wherein the hydroxy terminated soft-block moiety is substituted for a portion of the resorcinol moiety used to produce the resorcinol arylate chain.

57. The method of claim 56, wherein the soft-block moiety is derived from an oligomer of at least one of diethylene glycol, tetraethylene glycol, or a low molecular weight polyethylene glycol.

58. The method of claim 56, wherein the soft-block moiety is derived from at least one of a hydroxy-terminated aliphatic polyester or polycarbonate oligomer.

59. The method of claim 56, wherein the soft-block moiety is derived from a poly(tetrahydrofuran)diol.

60. The method of claim 56, wherein the soft-block moiety is derived from an o,p-mixture of citronellyl citronellate diphenol (CCDP).

61. The method of claim 56, wherein the soft-block moiety is derived from a siloxane oligomer as shown in Formula XII, Formula XII

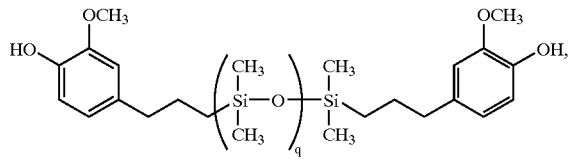

where q is 1–99; or a siloxane oligomer as shown in Formula XVI, wherein the moiety Ar is derived from a dihydroxy-substituted aromatic hydrocarbon and x has a value of about 10 to about 100:

Formula XVI

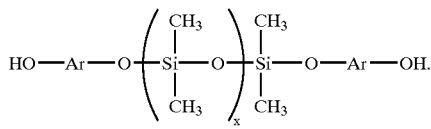

62. The method of claim 61, wherein the siloxane soft-block moiety of Formula XII comprises α, ω(3-(4-hydroxy-3-methoxy)-propyl)-deca(dimethylsiloxane) (ED10E) or 1,3 (bis-3-(4-hydroxy-3-methoxy)-propyl)-1,1,3,3,-tetramethyl disiloxane (EMME).

63. The method of claim 61, wherein the Ar moiety of the siloxane soft-block moiety of Formula XVI is derived from bisphenol A and x has a value of about 30 to about 100.

64. The method of claim 43, wherein the soft-block moiety is introduced into the polymer during synthesis of the organic carbonate group.

65. The method of claim 43, wherein the soft-block moiety is derived from a bisphenol functionalized with an aliphatic ester.

66. The method of claim 65, wherein the bisphenol functionalized with an aliphatic ester has the structure as shown in Formula XIII Formula XIII

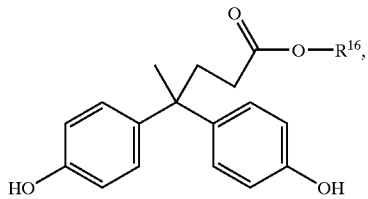

wherein $R^{16}$ comprises a $C_{4-20}$ aliphatic radical.

67. The method of claim 43, wherein the soft-block moiety comprises an aliphatic moiety introduced into the polymer using a chain stopper comprising an aliphatic tail.

68. The method of claim 67, wherein the soft-block moiety is derived from the structure of Formula XIV, Formula XIV

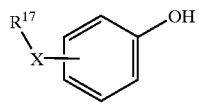

where X is —O— or —C$_2$—, and $R^{17}$ is a $C_6$–$C_{20}$ alkyl.

69. The method of claim 43, wherein the soft-block moiety comprises 0.1–25% by weight of the polymer.

70. The method of claim 43, wherein the soft-block moiety comprises 1–20% by weight of the polymer.

71. The method of claim 43, wherein the soft-block moiety comprises 2–10% by weight of the polymer.

72. The method of claim 43, wherein the reduction in melt viscosity upon addition of the soft-block moiety comprises greater than 10% at 250° C.

73. The method of claim 43, wherein the reduction in melt viscosity upon addition of the soft-block moiety comprises greater than 20% at 250° C.

74. The method of claim 43, wherein the polymer comprising the soft-block moiety comprises a glass transition temperature (Tg) of greater than 125° C.

75. The method of claim 43, wherein the polymer comprising the soft-block moiety comprises a glass transition temperature (Tg) of greater than 130° C.

76. A resorcinol ester polycarbonate polymer having good flow characteristics comprising:
(a) a resorcinol arylate polyester chain;
(b) at least one organic carbonate group; and
(c) at least one soft-block chemical moiety, wherein the soft-block moiety is derived from an o,p-mixture of citronellyl citronellate diphenol (CCDP).

77. A resorcinol ester polycarbonate polymer having good flow characteristics comprising:
(a) a resorcinol arylate polyester chain;
(b) at least one organic carbonate group; and
(c) at least one soft-block chemical moiety, wherein the soft-block moiety is derived from a siloxane oligomer as shown in Formula XII, Formula XII

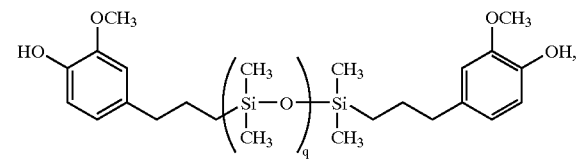

where q is 1–99; or a siloxane oligomer as shown in Formula XVI, wherein the moiety Ar is derived from a dihydroxy-substituted aromatic hydrocarbon and x has a value of about 10 to about 100:

Formula XVI

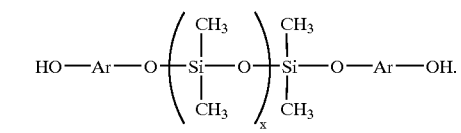

78. The polymer of claim 77, wherein the siloxane soft-block moiety of Formula XII comprises α, ω(3-(4-hydroxy-3-methoxy)-propyl)-deca(dimethylsiloxane) (ED10E) or 1,3 (bis-3-(4-hydroxy-3-methoxy)-propyl)-1,1,3,3,-tetramethyl disiloxane (EMME).

79. The polymer of claim 77, wherein the Ar moiety of the siloxane soft-block moiety of Formula XVI is derived from bisphenol A and x has a value of about 30 to about 100.

80. A resorcinol ester polycarbonate polymer having good flow characteristics comprising at least one soft-block moiety incorporated into a resorcinol phthalate-co-bisphenol A-polycarbonate copolymer substantially free of anhydride linkages, wherein the resorcinol phthalate-co-bisphenol A-polycarbonate copolymer comprises the structural unit of Formula IV, Formula IV

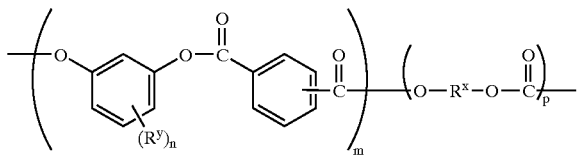

where $R^y$ is at least one of $C_{1-12}$ alkyl or halogen, n is 0–3, m is at least about 8, p is at least about 10, and $R^x$ is at least one divalent organic radical, wherein the organic radical comprises at least one aromatic, aliphatic, or cycloaliphatic radical; and the soft-block comprises and the soft-block comprises Formula XI:

Formula XI

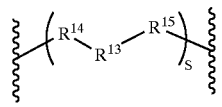

wherein s ranges up to and including 10; $R^{13}$ is $(CH_2)_4O(CH_2)_4$, and $R^{14}$ and $R^{15}$ each independently represent —O— to provide a soft block derived from poly(tetrahydrofuran)diol.

81. A method of making a resorcinol ester polycarbonate polymer having good flow characteristics comprising:
(a) generating a resorcinol arylate polyester chain;
(b) conducting an interfacial polymerization in the presence of at least one divalent organic radical to generate a poly(resorcinol arylate-co-polycarbonate) comprising an organic carbonate group; and
(c) incorporating at least one soft-block chemical moiety into the polymer during step (a) or step (b) or both, wherein the soft-block moiety is derived from an o,p-mixture of citronellyl citronellate diphenol (CCDP) such that the hydroxy terminated soft-block moiety is substituted for a portion of the resorcinol moiety used to produce the resorcinol arylate chain.

82. A method of making a resorcinol ester polycarbonate polymer having good flow characteristics comprising:
(a) generating a resorcinol arylate polyester chain; and
(b) conducting an interfacial polymerization in the presence of at least one divalent organic radical to generate a poly(resorcinol arylate-co-polycarbonate) comprising an organic carbonate group;
(c) incorporating at least one soft-block chemical moiety into the polymer during step (a) or step (b) or both, wherein the soft-block moiety is derived from a siloxane oligomer as shown in Formula XII, Formula XII

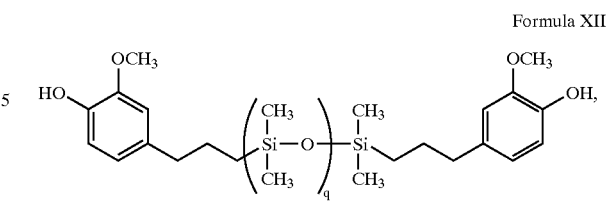

where q is 1–99; or a siloxane oligomer as shown in Formula XVI, wherein the moiety Ar is derived from a dihydroxy-substituted aromatic hydrocarbon and x has a value of about 10 to about 100:

Formula XVI

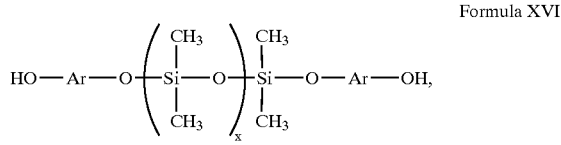

such that the hydroxy terminated soft-block moiety is substituted for a portion of the resorcinol moiety used to produce the resorcinol arylate chain.

83. The method of claim 82, wherein the siloxane soft-block moiety of Formula XII comprises α, ω(3-(4-hydroxy-3-methoxy)-propyl)-deca(dimethylsiloxane) (ED10E) or 1,3 (bis-3-(4-hydroxy-3-methoxy)-propyl)-1,1,3,3,-tetramethyl disiloxane (EMME).

84. The method of claim 82, wherein the Ar moiety of the siloxane soft-block moiety of Formula XVI is derived from bisphenol A and x has a value of about 30 to about 100.

85. The method of claim 1, wherein the stoichiometric ratio of total phenolic groups to total acid chloride groups for generation of the resorcinol arylate polyester chain is 1.5–1.01:1.

86. A resorcinol ester polycarbonate polymer having good flow characteristics comprising at least one soft-block moiety incorporated into a resorcinol phthalate-co-bisphenol A-polycarbonate copolymer substantially free of anhydride linkages, wherein the resorcinol phthalate-co-bisphenol A-polycarbonate copolymer comprises the structural unit of Formula IV, Formula IV

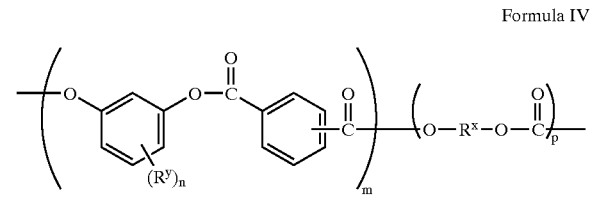

where $R^y$ is at least one of $C_{1-12}$ alkyl or halogen, n is 0–3, m is at least about 8, p is at least about 10, and $R^x$ is at least one divalent organic radical, wherein the organic radical comprises at least one aromatic, aliphatic, or cycloaliphatic radical; and the soft-block is derived from an mixture of citronellyl citronellate diphenol (CCDP).

* * * * *